US012004102B2

(12) United States Patent
Yoon

(10) Patent No.: US 12,004,102 B2
(45) Date of Patent: *Jun. 4, 2024

(54) APPARATUS AND METHOD FOR CONFIGURING SYNCHRONIZATION SIGNAL FOR COMMUNICATION BETWEEN USER DEVICES

(71) Applicant: Innovative Technology Lab Co., Ltd., Seoul (KR)

(72) Inventor: Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 6 days.

This patent is subject to a terminal disclaimer.

(21) Appl. No.: 17/885,518

(22) Filed: Aug. 10, 2022

(65) Prior Publication Data

US 2022/0394639 A1 Dec. 8, 2022

Related U.S. Application Data

(63) Continuation of application No. 17/137,240, filed on Dec. 29, 2020, now Pat. No. 11,452,056, which is a
(Continued)

(30) Foreign Application Priority Data

Nov. 5, 2014 (KR) .................. 10-2014-0153140
Nov. 13, 2014 (KR) .................. 10-2014-0158155

(51) Int. Cl.
*H04W 56/00* (2009.01)
*H04W 4/70* (2018.01)

(52) U.S. Cl.
CPC ........... *H04W 56/001* (2013.01); *H04W 4/70* (2018.02)

(58) Field of Classification Search
None
See application file for complete search history.

(56) References Cited

U.S. PATENT DOCUMENTS

2014/0314048 A1 10/2014 Yi et al.
2014/0323126 A1 10/2014 Ro et al.
(Continued)

FOREIGN PATENT DOCUMENTS

WO 2013028018 2/2013
WO 2014137170 9/2014

OTHER PUBLICATIONS

"3rd Generation Partnership Project; Technical Specification Group Radio Access Network; Evolved Universal Terrestrial Radio Access (E-UTRA); Physical channels and modulation (Release 12)," Sep. 2014, pp. 1-124, 3GPP TS 36.211 V12.3.0, 3GPP Organizational Partners.

(Continued)

*Primary Examiner* — Robert M Morlan

(57) ABSTRACT

Exemplary embodiments provide a method and apparatus for transmitting a synchronization signal for Device-to-Device (D2D) communication in a wireless communication system. The method includes: receiving, at a first UE, a D2D synchronization signal transmitted from a second UE, the D2D synchronization signal comprising a primary D2D synchronization signal (PD2DSS) and a secondary D2D synchronization signal (SD2DSS); determining a root index based on the received PD2DSS; and determining a type of a synchronization source based on the root index. The root index corresponds to an integer value X when the type of synchronization source is associated with D2DSSue_net. The root index corresponds to an integer value Y when the type of synchronization source is associated with
(Continued)

D2DSSue_oon. Each of the integer value X and integer value Y is not an element of a set {25, 29, 34}.

18 Claims, 8 Drawing Sheets

Related U.S. Application Data continuation of application No. 16/786,504, filed on Feb. 10, 2020, now Pat. No. 10,912,049, which is a continuation of application No. 16/292,787, filed on Mar. 5, 2019, now Pat. No. 10,602,467, which is a continuation of application No. 14/932,708, filed on Nov. 4, 2015, now Pat. No. 10,285,142.

(56) References Cited

U.S. PATENT DOCUMENTS

| | | |
|---|---|---|
| 2016/0044618 A1 | 2/2016 | Sheng et al. |
| 2017/0055234 A1 | 2/2017 | Seo et al. |
| 2017/0078998 A1 | 3/2017 | Li |
| 2017/0273041 A1 | 9/2017 | Seo et al. |

OTHER PUBLICATIONS

International Search Report for International Patent Application No. PCT/KR2015/011864, dated Feb. 5, 2016.

Written Opinion for International Patent Application No. PCT/KR2015/011864, dated Feb. 5, 2016.

Huawei et al., "Remaining details of D2D synchronization signals", R1-142843, 3GPP TSG-RAN WG1 Meeting #78, Dresden, Germany, Aug. 18-21, 2014, pp. 1-20, 3GPP.

ZTE, "PD2DSS root indices selection", R1-143813, 3GPP TSG RAN WG1 Meeting #78bis, Ljubljana, Slovenia, Oct. 6-10, 2014, pp. 1-7, 3GPP.

ITRI, "A consideration on PAPR/CM for PD2DSS and SD2DSS", R1-143899, 3GPP TSG-RAN WG1 #78bis, Ljubljana, Slovenia, Oct. 6-10, 2014, pp. 1-6, 3GPP.

LG Electronics, "Discussion on UE procedures for D2DSS transmission and reception", R1-144020, 3GPP TSG-RAN WG1 #78bis, Ljubljana, Slovenia, Oct. 6-10, 2014, pp. 1-4, 3GPP.

CATT, "Design of D2DSS and PD2DSCH", R1-142893, 3GPP TSG RAN WG1 Meeting #78, Dresden, Germany, Aug. 18-22, 2014, pp. 1-5, 3GPP.

CATT, "Design of D2DSS and PD2DSCH", R1-142007, 3GPP TSG RAN WG1 Meeting #77, Seoul, Korea, May 19-23, 2014, pp. 1-5, 3GPP.

Samsung, "D2D synchronization signal design, considering information indication", R1-143848, 3GPP TSG RAN WG1 #78bis, Ljubljana, Slovenia, Oct. 6-10, 2014, pp. 1-4, 3GPP.

The Extended European Search Report for European Patent Application No. 15857535.7, dated Aug. 1, 2018.

The First Office Action for Chinese Patent Application No. 201580060496.4, dated Dec. 30, 2019.

3GPP TSG RAN WG1 Meeting #78bis R1-144015 Ljubljana, Slovenia, Oct. 6-10, 2014; Source: LG; Electronics; Title: Details of D2D synchronization signal design.

(a)

(b)

(c)

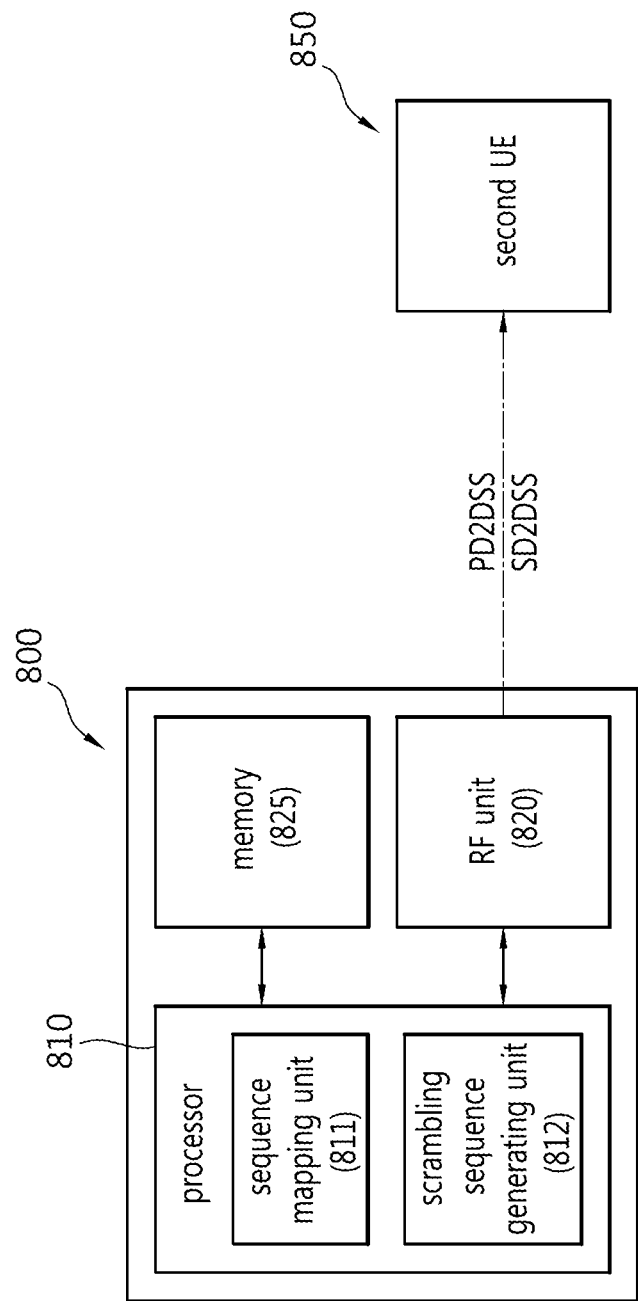

APPARATUS AND METHOD FOR CONFIGURING SYNCHRONIZATION SIGNAL FOR COMMUNICATION BETWEEN USER DEVICES

CROSS-REFERENCE TO RELATED APPLICATIONS

This application is a continuation of U.S. patent application Ser. No. 17/137,240, flied on Dec. 29, 2020, which is a continuation of U.S. patent application Ser. No. 16/786,504, flied on Feb. 10, 2020, now issued as U.S. Pat. No. 10,912,049 on Feb. 2, 2021, which is a continuation of U.S. patent application Ser. No. 16/292,787, flied on Mar. 5, 2019, now issued as U.S. Pat. No. 10,602,467 on Mar. 24, 2020, which is a continuation of U.S. patent application Ser. No. 14/932,708, flied on Nov. 4, 2015, now issued as U.S. Pat. No. 10,285,142 on May 7, 2019, which claims priority from and the benefit of Korean Patent Application Nos. 10-2014-0153140, filed on Nov. 5, 2014, and 10-2014-0158155, filed on Nov. 13, 2014, all of which are hereby incorporated by reference in their entirety.

BACKGROUND

1. Field

The present disclosure relates to wireless communication, and more particularly, to a method and apparatus for configuring a synchronization signal for Device-to-Device (D2D) communication.

2. Discussion of the Background

An amount of data transmitted through wireless communication has gradually increased. However, the frequency resources that service providers can provide are limited and have become increasingly saturated. Accordingly, mobile carriers have continuously developed technologies for discovering new frequencies and improving efficient use of frequencies. One of the actively studied technologies to ease the frequency resource shortage and to create a new mobile communication service is Device-to-Device (D2D) communication technology.

D2D communication refers to a technology in which User Equipments (UEs) which are geometrically adjacent to one another directly transmit and receive information without passing through an infrastructure, such as a base station. In the initial stage of the development, the D2D communication technology was developed and standardized mostly in a non-licensed band such as Wi-Fi, Direct, Bluetooth, which have been already commercialized. However, recently, the development of technologies and standardization for supporting D2D communication in a cellular system that uses a licensed band are underway. Representatively, the $3^{rd}$ Generation Partnership Project (3GPP), which is a mobile communication standardization association, actively conducts D2D communication technology standardization that is referred to as Proximity-based services (ProSe), which is one of the new technologies included in Long Term Evolution (LTE).

However, for the LTE wireless communication system, a method for using data resources for effectively providing D2D services has not been determined. Therefore, there is desire for a method of using resources for effectively supporting services.

SUMMARY

One or more exemplary embodiments provide a method and apparatus for configuring a synchronization signal for Device-to-Device (D2D) communication.

One or more exemplary embodiments provide a method and apparatus for determining a sequence mapping scheme and a scrambling scheme for a synchronization signal in D2D communication.

An exemplary embodiment provides a method of transceiving a synchronization signal by a user equipment (UE) supporting a device-to-device (D2D) communication between UEs, the method including: receiving, at a first UE, a D2D synchronization signal transmitted from a second UE, the D2D synchronization signal including a primary D2D synchronization signal (PD2DSS) and a secondary D2D synchronization signal (SD2DSS); determining a root index based on the received PD2DSS; and determining a type of a synchronization source based on the root index. The root index corresponds to an integer value X when the type of synchronization source is associated with D2DSSue_net, the root index corresponds to an integer value Y when the type of synchronization source is associated with D2DSSue_oon, and each of the integer value X and integer value Y is not an element of a set {25, 29, 34}.

An exemplary embodiment provides a method of transceiving a synchronization signal by a user equipment (UE) supporting a device-to-device (D2D) communication between UEs, the method including: determining a root index to generate a primary D2D synchronization signal (PD2DSS), the root index being associated with a type of a synchronization source; and transmitting, from a first UE to a second UE, a D2D synchronization signal, the D2D synchronization signal including the PD2DSS and a secondary D2D synchronization signal (SD2DSS). The root index corresponds to an integer value X when the synchronization source is associated with D2DSSue_net, the root index corresponds to an integer value Y when the synchronization source is associated with D2DSSue_oon, and each of the integer value X and integer value Y is not an element of a set {25, 29, 34}.

An exemplary embodiment provides a user equipment (UE) supporting a device-to-device (D2D) communication between UEs, the UE including: a processor configured to determine a root index to generate a primary D2D synchronization signal (PD2DSS), the root index being associated with a type of a synchronization source; and a wireless transceiver to transmit a D2D synchronization signal to another UE, the D2D synchronization signal including the PD2DSS and a secondary D2D synchronization signal (SD2DSS). The root index corresponds to an integer value X when the synchronization source is associated with D2DSSue_net, the root index corresponds to an integer value Y when the synchronization source is associated with D2DSSue_oon, and each of the integer value X and integer value Y is not an element of a set {25, 29, 34}.

In D2D communication, a D2D transmission User Equipment (D2D TxUE) may effectively configure a synchronization signal and may indicate the same to a D2D reception UE (D2D RxUE), which is an advantage. Particularly, this may further reduce interference during synchronization signal transmission between UEs, and predetermined information such as a D2D synchronization source type, a duplex mode, or the like, may be transferred together through a synchronization signal.

BRIEF DESCRIPTION OF THE DRAWINGS

FIG. 8 is a block diagram illustrating UEs that execute D2D communication according to one or more exemplary embodiments.

DETAILED DESCRIPTION OF THE ILLUSTRATED EMBODIMENTS

Figure 1:
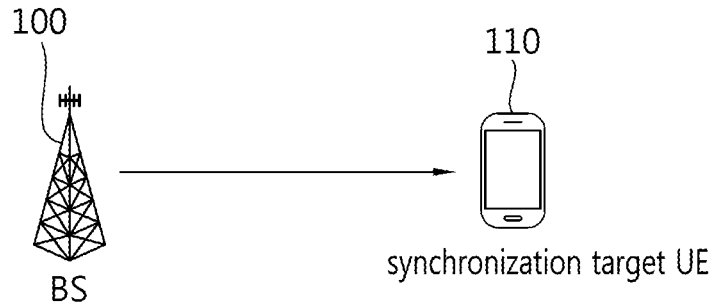
FIG. 1 is a conceptual diagram illustrating a synchronization method for D2D communication according to one or more exemplary embodiments.
Figure 1:
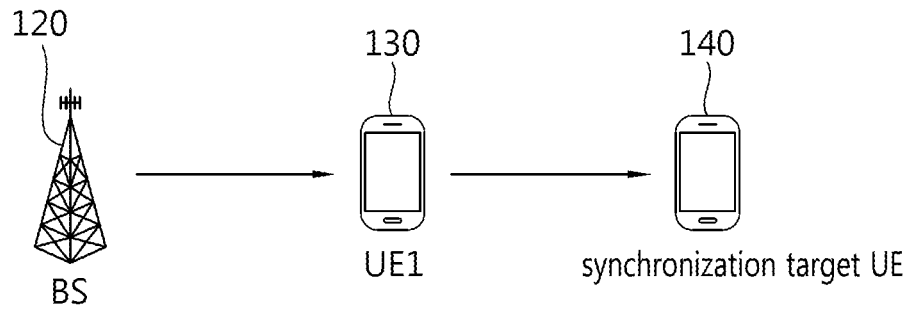
Figure 1:
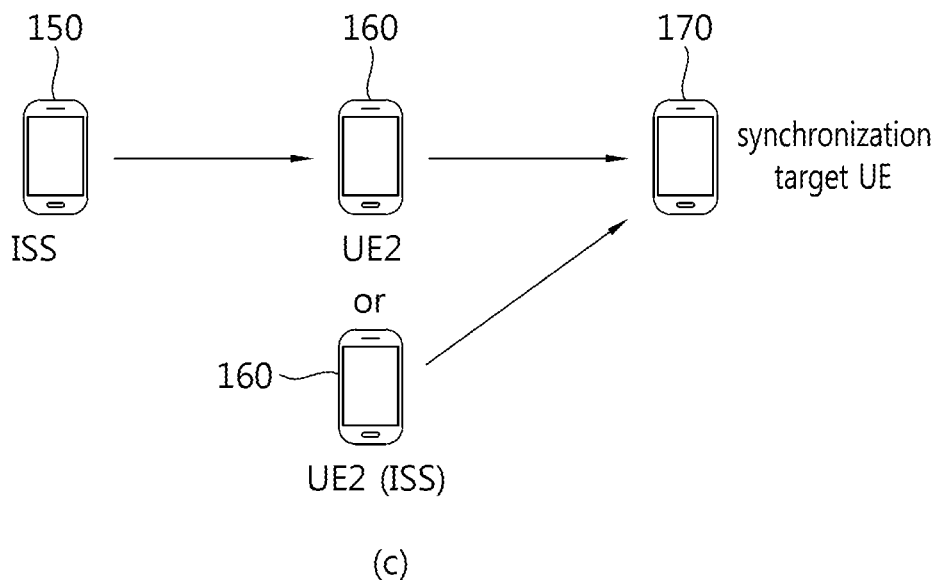

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. The present specification provides descriptions in association with a wireless communication network, and tasks executed in the wireless communication network may be performed in the process where a system (for example, a base station) that manages the corresponding wireless communication network controls the network and transmits data, or may be performed in a User Equipment (UE) that is wireless linked to the corresponding network and capable of communicating with the network system.

FIG. 1 is a conceptual diagram illustrating a synchronization method for D2D communication according to one or more exemplary embodiments.

Referring to FIG. 1, a synchronization method in D2D communication may be roughly classified into three cases, that is, scenarios (a), (b), and (c) of FIG. 1, based on the following differences.

The scenario (a) discloses the case in which a synchronization target User Equipment (UE) 110 is synchronized by receiving a PSS (primary synchronization signal)/SSS (secondary synchronization signal) from a Base Station (BS) 100. The scenarios (b) and (c) disclose the case in which a synchronization target UE 140 and 170 is synchronized by receiving, from a UE 130 and 160, a PD2DSS (primary D2D synchronization signal)/SD2DSS (secondary D2D synchronization signal), which will be described later. The scenarios (b) and (c) are distinguished based on whether an active synchronization source is a BS 120 or an ISS 150.

The synchronization executed in the scenarios (a), (b), and (c) will be described in detail as follows.

The scenario (a) discloses a method in which a synchronization target UE is synchronized based on a synchronization signal transmitted from a BS in D2D communication.

Referring to the scenario (a), a synchronization source for D2D communication of the synchronization target UE 110 is the BS 100, and the BS 100 is an active synchronization source. A synchronization signal transmitted from the BS 100 to the synchronization target UE 110 may be a PSS (primary synchronization signal)/SSS (secondary synchronization signal). The synchronization target UE 110 may receive a PSS/SSS from the BS, and executes frequency synchronization and/or time synchronization based on the received PSS/SSS, and may execute D2D communication with another UE.

Referring to the scenario (b), the synchronization target UE 140 is synchronized with the UE 1 130, and the UE 1 130 may be a passive synchronization source that is synchronized with the BS 120 which is an active synchronization source. Between the UE 1 130 and the BS 120, a plurality of passive synchronization sources may exist. For ease of descriptions, the scenario (b) assumes that the UE 1 130 is synchronized directly with the BS 120. The UE 1 130 may be a passive synchronization source, which is synchronized based on a synchronization signal (PSS/SSS) transmitted from the BS 120. The UE 1 130 that is synchronized with the BS 120 may transmit a D2DSS (D2D synchronization source) to the synchronization target UE 140. The synchronization target UE 140 may be synchronized with the UE 1 130 based on the D2DSS received from the UE 1 130. The D2DSS may include a PD2DSS (primary D2D synchronization signal) and an SD2DSS (secondary D2D synchronization signal). The PD2DSS and the SD2DSS will be described later.

Referring to the scenario (c), the synchronization target UE 170 is synchronized with the UE 2 160, and the UE 2 160 may be a passive synchronization source that is synchronized with the ISS 150 which is an active synchronization source, or the UE 2 160 itself may be an active synchronization source. When the UE 2 160 is a passive synchronization source, a plurality of different passive synchronization sources may exist between the UE 2 160 and the ISS 150. That is, the synchronization target UE 170 may be synchronized based on a D2DSS (D2D synchronization source) transmitted to the synchronization target UE 170 from the UE 2 160 that acts as an active synchronization source or the UE 2 160 that is synchronized based on the ISS 150 and acts as a passive synchronization source.

In the case of scenario (a), the synchronization target UE 110 may obtain information associated with a Physical Cell Identity (PCID) of a BS, based on a PSS/SSS, as in the LTE system. Conversely, like the scenario (b) and (c), when the synchronization target UE 140 and 170 receives a D2DSS, the synchronization target UE 140 and 170 may obtain identity information of an active synchronization source based on the D2DSS.

The synchronization source identification information may be expressed as a term, a PSSID (physical synchronization source identity or a physical layer sidelink synchronization identity). After a passive synchronization source is synchronized by an active synchronization source, it transmits a synchronization signal to a synchronization target UE, and the identification information of the passive synchronization source is based on the identification information of the active synchronization source. Accordingly, the synchronization source identification information (PSSID) is actually the active synchronization source identification information. In D2D communication, sidelink is used to express a communication link between UEs, instead of using an uplink or a downlink. As a parameter to indicate physical layer sidelink synchronization identity (PSSID), an NIDD2D ($N_{ID}^{D2D}$) indicating a D2D synchronization ID, an NIDSL ($N_{ID}^{SL}$) indicating a physical layer sidelink synchronization ID, or the like, may be used. In D2D communication, a UE other than an Evolved NodeB may serve as a synchronization source by becoming an independent synchronization source (ISS) as described above with respect to FIG. 1. The synchronization source may be referred to as the PSSID, NIDD2D, or NIDSL.

As described above, in the case of the scenario (b) and (c), the synchronization target UE 140 and 170 may obtain active synchronization source identification information based on the D2DSS. Particularly, in the case of the scenario (b), the synchronization target UE 140 may obtain active synchronization source identification information corresponding to the BS 120 based on the D2DSS. In the case of the scenario (c), the synchronization target UE 170 may obtain active synchronization source identification information corresponding to the ISS 150 based on the D2DSS. The synchronization target UE 140 and 170 may obtain identification information of a BS or an ISS that acts as an active synchronization source, based on the active synchronization source identification information (PSSID) and additional identification information transmitted through a PD2DSCH (Physical D2D Synchronization Channel). When the active synchronization source is a BS, the identification information of the BS may be a PCID. When the active synchronization source is an ISS, the identification information of the ISS is a UE ID of a UE that acts as an ISS, and may be an IMSI (international mobile subscriber identity), an IMEI (international mobile equipment identity), ProSe (Proximity based Services) ID, or the like.

According to one or more exemplary embodiments, when the active synchronization source is the BS 120, like the scenario (b), the PD2DSS/SD2DSS may be generated based on one of the sequences included in a D2DSSue_net set. When the active synchronization source is the ISS 150, like the scenario (c), the PD2DSS/SD2DSS may be generated based on one of the sequences included in a D2DSSue_oon set. That is, according to one or more exemplary embodiments, when the synchronization target UE 140 and 170 does not directly receive a synchronization signal from a BS, the synchronization target UE may receive a synchronization signal, which is generated based on different sequence sets, based on whether the active synchronization source is the BS 120 or the ISS 150. Hereinafter, D2DSSue_net may be expressed as a BS source sequence set, and D2DSSue_oon may be expressed as a UE source sequence set. For example, a physical-layer sidelink synchronization identity may be represented by $N_{ID}^{SL} \in \{0, 1, \ldots, 335\}$, and categorized into D2DSSue_net corresponding to identities $\{0, 1, \ldots, 167\}$ for in network and D2DSSue_oon corresponding to identities $\{168, 169, \ldots, 335\}$ for out of network. If a synchronization source is an eNodeB, D2DSSue_net may be used. If a synchronization source is a UE, which serves as an ISS, D2DSSue_oon may be used.

The synchronization target UE 140 and 170 may determine whether the active synchronization source is the BS 120 or the ISS 150, based on information associated with a sequence that generates a received PD2DSS/SD2DSS.

Hereinafter, a sequence for generating a PD2DSS and an SD2DSS will be described.

A PSS may be generated based on the Zadoff-Chu sequence as shown below.

$$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In Equation 1, u denotes a root sequence index defined by Table 1.

TABLE 1

| $N_{ID}^{(2)}$ | Root index u |
|---|---|
| 0 | 25 |
| 1 | 29 |
| 2 | 34 |

That is, the PSS may be generated based on a root index that is selected from among 25, 29, and 34. In Table 1, $N^{(2)}_{ID}$ that determines a root index may be selected based on a PCID of a BS that transmits the PSS.

A sequence d(n) used for the PSS may be mapped to a resource element, based on Equation 2.

$$a_{k,l} = d(n), n = 0, \ldots, 61 \quad \text{[Equation 2]}$$

$$k = n - 31 + \frac{N_{RB}^{DL} N_{sc}^{RB}}{2}$$

Here, $a_{k,l}$ denotes a resource element, k denotes a subcarrier number, and l denotes a symbol number. $N^{DL}_{RB}$ is replaced with $N^{SL}_{RB}$ for sidelink ($N^{DL}_{RB}$ denotes the number of downlink resource blocks (RBs)) (in the case of D2D, $N^{SL}_{RB}$ denotes the number of sidelink resource blocks), and $N^{RB}_{SC}$ denotes the number of subcarriers in a single resource block.

An RE corresponding to Equation 3 from among REs (k, l) of OFDM symbols may not be used but may be reserved for transmission of a PSS.

$$k = n - 31 + \frac{N_{RB}^{DL} N_{sc}^{RB}}{2} \quad \text{[Equation 3]}$$

$$n = -5, -4, \ldots, -1, 62, 63, \ldots 66$$

A sequence d(0), . . . , d(61) used for an SSS may be generated by interleaving two binary sequences.

The length of each of the two m-sequences is 31. The combination of two m-sequences having a length of 31, which defines the SSS, may have different values between a subframe 0 and a subframe 5, based on Equation 4.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 4]}$$

-continued $$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

In Equation 4, n has a value that satisfies $0 \leq n \leq 30$. $m_0$ and $m_1$ may be obtained from a physical layer cell identity (ID) group based on Equation 5.

$$m_0 = m' \bmod 31$$ [Equation 5]
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor, q' = \lfloor N_{ID}^{(1)}/30 \rfloor$$

Here, $N^{(1)}_{ID}$ may be determined based on a PCID of a BS that transmits the SSS. That is, the SSS may be determined based on a value of PCID group $N^{(1)}_{ID}$.

The results derived from Equation 5 may be represented as values shown in Table 2.

TABLE 2

| $N^{(1)}_{ID}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |

TABLE 2-continued

| $N^{(1)}_{ID}$ | $m_0$ | $m_1$ |
|---|---|---|
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Two sequences $s_0^{(m_0)}(n)$ and $s_1^{(m_1)}(n)$ may be defined as two different cyclic shifts of an m-sequence, $\tilde{s}(n)$ based on Equation 6.

$$s_0^{(m_0)}(n) = \tilde{s}((n+m_0) \bmod 31)$$

$$s_1^{(m_1)}(n) = \tilde{s}((n+m_1) \bmod 31) \quad \text{[Equation 6]}$$

Equation 6 satisfies $\tilde{s}(i) = 1 - 2x(i)$ and $0 \le i \le 30$, and x(i) may be defined by Equation 7.

$$x(\bar{i}+5) = (x(\bar{i}+2) + x(\bar{i})) \bmod 2, 0 \le \bar{i} \le 25 \quad \text{[Equation 7]}$$

In Equation 7, the initial value of x(i) may be set to x(0)=0, x(1)=0, x(2)=0, x(3)=0, x(4)=1.

$c_0(n)$ and $c_1(n)$, which are two scrambling sequences, may be determined based on a PSS, and may be defined by two different cyclic shifts of an m-sequence $\tilde{c}(n)$ based on Equation 8.

$$c_0(n) = \tilde{c}((n+N_{ID}^{(2)}) \bmod 31)$$

$$c_1(n) = \tilde{c}((n+N_{ID}^{(2)}+3) \bmod 31) \quad \text{[Equation 8]}$$

In Equation 8, $N_{ID}^{(2)} \in \{0,1,2\}$ is a physical layer ID in a physical layer cell ID group $N_{ID}^{(1)}$, Equation 8 satisfies $\tilde{c}(i) = 1 - 2x(i)$ and $0 \le i \le 30$, and x(i) is defined by Equation 9.

$$x(\bar{i}+5) = (x(\bar{i}+3) + x(\bar{i})) \bmod 2, 0 \le \bar{i} \le 25 \quad \text{[Equation 9]}$$

In Equation 9, the initial value of x(i) may be set to x(0)=0, x(1)=0, x(2)=0, x(3)=0, x(4)=1.

Scrambling sequences $z_1^{(m_0)}(n)$ and $z_1^{(m_1)}(n)$ may be defined by a cyclic shift of an m-sequence z(n) based on Equation 10.

$$z_1^{(m_0)}(n) = \tilde{z}((n+(m_0 \bmod 8)) \bmod 31)$$

$$z_1^{(m_1)}(n) = \tilde{z}((n+(m_1 \bmod 8)) \bmod 31) \quad \text{[Equation 10]}$$

In Equation 10, $m_0$ and $m_1$ may be obtained through Table 2, and satisfy $\tilde{z}(i) = 1 - 2x(i)$ and $0 \le i \le 30$, and x(i) may be defined by Equation 11.

$$x(\bar{i}+5) = (x(\bar{i}+4) + x(\bar{i}+2) + x(\bar{i}+1) + x(\bar{i})) \bmod 2, 0 \le \bar{i} \le 25 \quad \text{[Equation 11]}$$

In Equation 11, the initial condition of x(i) may be set to x(0)=0, x(1)=0, x(2)=0, x(3)=0, x(4)=1.

Mapping of a sequence used for the SSS to REs is determined based on a frame structure.

The sequence d(n) may be mapped to REs based on Equation 12.

$$a_{k,l} = d(n), n = 0, \ldots, 61 \quad \text{[Equation 12]}$$

$$k = n - 31 + \frac{N_{RB}^{DL} N_{sc}^{RB}}{2}$$

$$l = \begin{cases} N_{symb}^{DL} - 2 & \text{in slots 0 and 10 for frame structure } type1 \\ N_{symb}^{DL} - 1 & \text{in slots 1 and 11 for frame structure } type2 \end{cases}$$

Here, $a_{k,l}$ denotes a resource element, k denotes a subcarrier number, and l denotes a symbol number (the definition of l in equation 12 is a non-limiting example). $N^{DL}_{RB}$ is replaced with $N^{SL}_{RB}$ for sidelink ($N^{DL}_{RB}$ denotes the number of downlink resource blocks (RBs)) (in the case of D2D, $N^{SL}_{RB}$ denotes the number of sidelink resource blocks), and $N^{RB}_{SC}$ denotes the number of subcarriers in a single resource block. $N^{DL}_{symb}$ denotes the number of symbols, e.g., OFDM symbols, in a downlink slot. Thus, for D2DSS, the parameter k defined in Equation 12 may be modified as $$k = n - 31 + \frac{N_{RB}^{SL} N_{SC}^{RB}}{2}.$$

For D2DSS, the parameter l defined in Equation 12 may be modified by replacing $N_{symb}^{DL}$ with $N_{symb}^{SL}$, which denotes the number of SC-FDM symbols in a sidelink slot.

An RE corresponding to Equation 13 from among REs (k, l) of OFDM symbols may not be used but may be reserved for transmission of an SSS.

$$k = n - 31 + \frac{N_{RB}^{DL} N_{sc}^{RB}}{2} \quad \text{[Equation 13]}$$

$$l = \begin{cases} N_{symb}^{DL} - 2 & \text{in slots 0 and 10 for frame structure } type1 \\ N_{symb}^{DL} - 1 & \text{in slots 1 and 11 for frame structure } type2 \end{cases}$$

$$n = -5, -4, \ldots, -1, 62, 63, \ldots 66$$

As described above, $s_0^{(m_0)}(n)$ and $s_1^{(m_1)}(n)$, $c_0(n)$ and $c_1(n)$, and $z_1^{(m_0)}(n)$ and $z_1^{(m_1)}(n)$ are m-sequences having a length of 31, respectively. Through the above, as shown in Equation 4, only 168 sequences out of the possible sequences that may be generated based on the m-sequences having a length of 31, may be used for generating the SSS.

Referring to Table 2, $N^{(1)}_{ID}$ is an integer in the range from 0 to 167, and each integer may correspond to one of the 168 sequences.

A BS may generate a PSS/SSS based on $N^{(2)}_{ID}$ and $N^{(1)}_{ID}$ corresponding to an allocated PCID. A UE may obtain $N^{(2)}_{ID}$ based on a PSS received from a BS, and also, may obtain $N^{(1)}_{ID}$ based on an SSS received from a BS. The UE may determine a PDID of a BS as $N^{cell}_{ID}=3N^{(1)}_{ID}+N^{(2)}_{ID}$. That is, the UE may obtain the PCID of the BS, based on the received PSS/SSS in the LTE system.

According to one or more exemplary embodiments, a PD2DSS may be a synchronization signal generated based on a root index which is different from 25, 29, or 34. For example, the root index for generating the PD2DSS may be one of the three new root indices (X, Y, or Z) or may be one of the two new root indices (X or Y), which is different from 25, 29, and 34.

Also, according to one or more exemplary embodiments, an SD2DSS may be a synchronization signal generated based on one out of 168 or fewer sequences (for example, 128 sequences) for an SSS.

Figure 2:
FIG. 2 is a conceptual diagram illustrating a synchronization subframe for D2D communication according to one or more exemplary embodiments.

FIG. 2 is a conceptual diagram illustrating a synchronization subframe for D2D communication according to one or more exemplary embodiments.

Referring to FIG. 2, a synchronization subframe for D2D communication may be a subframe for transmitting a D2DSS (D2D Synchronization Signal), which is a synchronization signal for D2D. A D2D subframe may be configured based on a predetermined period, and the configuration may be identical between inside (in-coverage) the network coverage and outside (out-of-coverage) the network coverage. An example of the predetermined period may be 40 ms. In this instance, one of the 40 subframes may be a synchronization subframe used for transmitting a synchronization signal of D2D.

A D2DSS may be transmitted in the synchronization subframe. The D2DSS may include a PD2DSS and an SD2DSS. In this instance, the PD2DSS and the SD2DSS may be transmitted respectively using two symbols in the synchronization subframe, as shown in FIG. 2. Also, as shown in FIG. 2, in the synchronization subframe, a PD2DSCH (Physical D2D Synchronization Channel, or a PSBCH (Physical Sidelink Broadcast Channel) indicating a physical broadcasting channel in a sidelink, which corresponds to a PBCH (Physical Broadcast Channel) indicating a physical broadcasting channel in a downlink) may be transmitted. To this end, a DM-RS (Demodulation Reference Signal) may be transmitted as a demodulation reference signal. Here, FIG. 2 is merely an example. Excepting that the PD2DSS and the SD2DSS are transmitted, respectively using two symbols (a total of four symbols) in a single synchronization subframe, the location of the four symbols may be defined to be different from the example of FIG. 2 in the synchronization subframe.

For example, with respect to 14 symbols included in a single subframe having a normal CP (cyclic prefix), in the example of FIG. 2, a PD2DSS is transmitted by being mapped to second and ninth symbols, and an SD2DSS is transmitted by being mapped to third and tenth symbols. As another example, a PD2DSS may be transmitted by being mapped to second and thirteenth symbols, and an SD2DSS may be transmitted by being mapped to first and twelfth symbols. As another example, a PD2DSS may be transmitted by being mapped to seventh and eighth symbols, and an SD2DSS may be transmitted by being mapped to second and thirteenth symbols. As another example, a PD2DSS may be transmitted by being mapped to second and twelfth symbols, and an SD2DSS may be transmitted by being mapped to third and thirteenth symbols.

Figure 3:
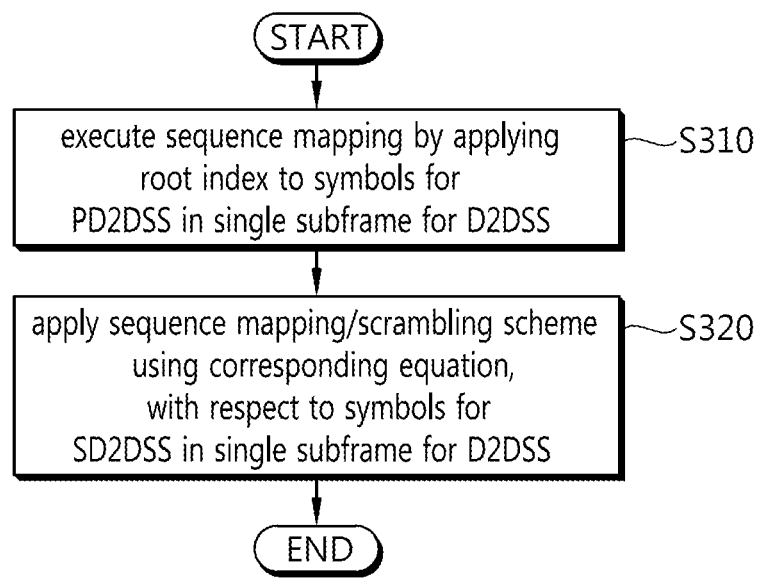
FIG. 3 is a conceptual diagram illustrating a synchronization method for D2D communication according to one or more exemplary embodiments.

FIG. 3 is a conceptual diagram illustrating a synchronization method for D2D communication according to one or more exemplary embodiments.

Referring to FIG. 3, in operation S310, a PD2DSS may be one of the three root indices X, Y, and Z, or may be one of the two root indices X and Y. The three root indices or the two root indices for the PD2DSS may be new root indices, excluding the root indices 25, 29, and 34 which are used for a PSS.

For example, three root indices (X, Y, and Z) may be selected out of the integers in the range from 1 to 62, excluding 25, 29, and 34, or two root indices (X and Y) may be selected out of the integers in the range from 1 to 62, excluding 25, 29, and 34.

The PD2DSS may have a signal waveform based on an SC-FDM (Single Carrier-Frequency Division Multiplexing) excluding a DFT (Discrete Fourier Transform)-precoding. This is different in that the PSS has a signal waveform based on an OFDM (Orthogonal Frequency Division Multiplexing).

In operation S320, an SD2DSS may be a synchronization signal generated based on a sequence selected out of p sequences. For example, p indicates the number of sequences for an SSS, which is equal to or less than 168 (for example, p=128).

The SD2DSS may have a signal waveform based on an SC-FDM (Single Carrier-Frequency Division Multiplexing) excluding a DFT(Discrete Fourier Transform)-precoding, and may have power reduced than the PD2DSS. This is different in that the SSS has a signal waveform based on an OFDM (Orthogonal Frequency Division Multiplexing).

Therefore, the PSS and the PD2DSS according to one or more exemplary embodiments may be compared as follows.

The PSS is mapped to two subframes in 10 ms corresponding to ten subframes (that is one for each 5 ms), and is mapped to a single symbol in each of the two subframes. Conversely, the PD2DSS may be mapped to one subframe in 40 ms corresponding to 40 subframes, and may be mapped to two symbols in the single subframe.

The PSS uses one of 25, 29, and 34, as a root index. In this instance, when the root indices are 25, 29, and 34, $N^{(2)}_{ID}$ may be 0, 1, and 2, respectively. Conversely, the PD2DSS may use one of the new root indices, which is a number other than 25, 29, and 34, from among the integers in the range from 1 to 62. For example, one of the three new root indices may be used. In this instance, when the three new root indices are X, Y, and Z, $N^{(2)}_{ID}$ may be 0, 1, and 2, respectively. As another example, one of the two new root indices, which is a number other than 25, 29, and 34, from among the integer in the range from 1 to 62, may be used as a root index of the PD2DSS. In this instance, the two new root indices are X and Y, $N^{(2)}_{ID}$ may be 0 and 1, respectively.

Here, as the root indices of the PSS respectively correspond to $N^{(2)}_{ID}$, and the combinations of $m_0$ and $m_1$ values of SSS respectively correspond to $N^{(1)}_{ID}$, the new root indices of the PD2DSS respectively correspond to $N^{(2)}_{ID}$, and the combinations of the $m_0$ and $m_1$ values of SD2d respectively correspond to $N^{(1)}_{ID}$. In this instance, a PSSID may be indicated from a PD2DSS/SD2DSS in the same manner in which a PCID is indicated from $N^{cell}_{ID}=3N^{(1)}_{ID}+N^{(2)}_{ID}$ through a PSS/SSS, or may not be indicated in such a way. For example, the PSSID may be indicated by only the SD2DSS. That is, the combinations of the $m_0$ and $m_1$ vales of the SD2DSS may respectively correspond to $N^{(1)}_{ID}$, and $N^{(1)}_{ID}$ may be the PSSID. In this instance, $N^{(2)}_{ID}$ corresponding to each of the new root indices of the PD2DSS may be used for indicating different information, as opposed to indicating the PSSID.

The SSS and the SD2DSS according to one or more exemplary embodiments may be compared as follows.

The SSS is mapped to two subframes in 10 ms corresponding to ten subframes (that is one for each 5 ms), and is mapped to a single symbol in each of the two subframes. Conversely, the SD2DSS may be mapped to one subframe in 40 ms corresponding to 40 subframes, and may be mapped to two symbols in the single subframe.

The SSS may be generated by mapping a sequence and applying scrambling based on the above description provided through Equation 4 to Equation 13. That is, a sequence mapping scheme and a scrambling scheme is different for each of the two subframes (subframe 0 and subframe 5) in the period of 10 ms. Conversely, the SD2DSS may be mapped to two symbols in a single subframe in the period of 40 ms and thus, a sequence mapping scheme and a scrambling scheme should be reconsidered respectively. That is, the above descriptions provided through Equations 4 to 13 for the SSS should be reconsidered for the SD2DSS. Particularly, Equation 4 and Equation 8 should be modified to be appropriate for the SD2DSS.

Accordingly, hereinafter, sequence mapping for the PD2DSS and a sequence mapping scheme and a scrambling scheme for the SD2DSS will be described in detail, based on the above described considerations.

First Embodiment

Figure 4:
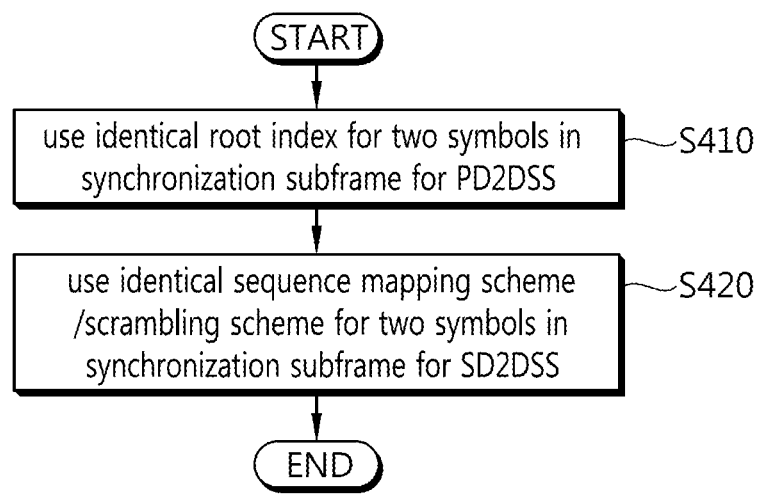
FIG. 4 is a flowchart illustrating a synchronization method for D2D communication according to one or more exemplary embodiments.

FIG. 4 is a flowchart illustrating a synchronization method for D2D communication according to one or more exemplary embodiments.

Referring to FIG. 4, in the case of a PD2DSS, an identical root index is used for two symbols for a PD2DSS in a synchronization subframe in operation S410. That is, a synchronization source may generate the PD2DSS using the identical root index for the two symbols in the synchronization subframe, and may transmit the same to a synchronization target UE.

In the case of an SD2DSS, an identical sequence mapping scheme and an identical scrambling scheme may be used for the two symbols for an SD2DSS in the synchronization subframe, in operation S420.

Each operation of this flowchart will be described in detail as follows.

First, operation S410 corresponds to the case where three root indices (X, Y, and Z) for the PD2DSS are used. In this instance, the synchronization source may map an identical root index to the two symbols for the PD2DSS in a single synchronization subframe (for example, a single subframe in the period of 40 ms) for a D2DSS. For example, in the synchronization subframe of the structure identical to FIG. 2, the synchronization source may generate a sequence based on an identical root index with respect to a second symbol and a ninth symbol, apply identical scrambling, and transmit a PD2DSS. In this instance, a root index to be used may be determined based on a predetermined condition. For example, root index X may be used for condition A, root index Y may be used for condition B, and root index Z may be used for condition C.

Here, the conditions (condition A, condition B, and condition C) may be defined based on information transmitted through a PD2DSS. In other words, the information indicated by the PD2DSS may be identified based on the conditions. That is, the information indicated by the PD2DSS is identified based on the root indices X, Y, and Z, and thus, the information may be implicitly signaled through the PD2DSS.

As a first example of the first embodiment, when a synchronization source type is transmitted through a PD2DSS, the conditions may be classified into the condition A, the condition B, and the condition C, based on the synchronization source type (three types including a synchronization source for transmitting a D2DSS included in D2DSSue_net and corresponding to transmission from an in-coverage D2D UE to an out-of-coverage D2D UE, a synchronization source for transmitting a D2DSS included in D2DSSue_net and corresponding to transmission from an out-of-coverage D2D UE to an out-of-coverage D2D UE, and a synchronization source for transmitting a D2DSS included in D2DSSue_oon).

As a second example of the first embodiment, when a stratum level (or a hop count) indicating the number of synchronization sources that a synchronization signal passes through from an active synchronization source, is indicated through a PD2DSS, the conditions may be classified into condition A, condition B, and condition C, based on the stratum level.

As a third example of the first embodiment, when a PSSID is indicated through a PD2DSS and an SD2DSS, the conditions may be classified into condition A, condition B, and condition C, based on the PSSID.

The first to third examples of the first embodiment may be listed up in the table provided below.

TABLE 3

| example | Information indicated by PD2DSS | Root index X | Root index Y | Root index Z |
|---|---|---|---|---|
| First | Synchronization source type | In-coverage synchronization source for transmitting D2DSS included in D2DSSue_net | Out-of-coverage synchronization source for transmitting D2DSS included in D2DSSue_net | Synchronization source for transmitting D2DSS included in D2DSSue_oon |
| Second | Stratum level | 0 | 1 | 2 |
| Third | PSSID | (PSSID)mod3 = 0 | (PSSID)mod3 = 1 | (PSSID)mod3 = 2 |

Referring to Table 3, in the case of the second example, for example, when the stratum level is 1, it is set to be indicated by the root index X. When the stratum level is 2, it is set to be indicated by the root index Y. When the stratum level is 3, it is set to be indicated by the root index Z. As a matter of course, this is merely an example, and a method of classifying information indicated by a PD2DSS based on a root index X, Y, or Z, may be variously modified. For example, the stratum levels 0, 1, and 2 may be mapped to root indices Y, Z, and X, respectively.

When a synchronization target UE receives the PD2DSS, the synchronization target UE may implicitly recognize a synchronization source type (in the case of the first example), a stratum level (in the case of second example), a PSSID (in the case of the third example), or the like, based on the root indices X, Y, and Z.

Subsequently, in association with operation S420, the synchronization source may use a sequence mapping scheme and a scrambling scheme of Equation 14 (Equation 14 is substituted for Equation 4 for an SSS) equally with respect to each of the two symbols for the SD2DSS in the single synchronization subframe for the D2DSS. Here, condition 1 and condition 2 may be referred to as sequence mapping/scrambling scheme 1 and sequence mapping/scrambling scheme 2, respectively.

[Equation 14]

$d(2n) = s_0^{(m0)}(n) c_0(n)$ in 1st symbol and 2nd symbol for SD2DSS within a subframe $d(2n+1) = s_1^{(m1)}(n) c_1(n) z_1^{(m0)}$ in 1st symbol and 2nd symbol for SD2DSS within a subframe or $d(2n) = s_0^{(m0)}(n)$ in 1st symbol and 2nd symbol for SD2DSS within a subframe $d(2n+1) = s_1^{(m1)}(n) z_1^{(m0)}$ in 1st symbol and 2nd symbol for SD2DSS within a subframe    Condition 1:

$d(2n) = s_1^{(m1)}(n) c_0(n)$ in 1st symbol and 2nd symbol for SD2DSS within a subframe $d(2n+1) = s_0^{(m1)}(n) c_1(n) z_1^{(m1)}$ in 1st symbol and 2nd symbol for SD2DSS within a subframe or $d(2n) = s_1^{(m1)}(n)$ in 1st symbol and 2nd symbol for SD2DSS within a subframe)

$d(2n+1) = s_0^{(m1)}(n) z_1^{(m1)}$ in 1st symbol and 2nd symbol for SD2DSS within a subframe    Condition 2:

In Equation 14, the part of condition 1 may be identical or similar to a sequence mapping scheme and a scrambling scheme in subframe 0 of the SSS. In Equation 14, the part of condition 2 may be identical or similar to a sequence mapping scheme and a scrambling scheme in subframe 5 of the SSS.

That is, the equation of the upper part of each condition of Equation 14 is identical to the sequence mapping scheme and the scrambling scheme in subframe 0 or subframe 5 of the SSS. Although the equation of the lower part of each condition of Equation 14 is identical to the sequence mapping scheme in subframe 0 or subframe 5 of the SSS, the scrambling by $N_{ID}^{(2)}$ may be excluded from the scrambling scheme and only the scrambling by $m_0$ or $m_1$ may be identical.

When scrambling by $N_{ID}^{(2)}$ is excluded from the scrambling scheme, Equation 8 may not be used. When scrambling by $N_{ID}^{(2)}$ is not excluded, Equation 8 may be used.

In this instance, the conditions (condition 1 and condition 2) may be defined based on information transmitted through the SD2DSS, one of the conditions may be fixed and used for the SD2DSS based on a System Frame Number (SFN) or a D2D Frame Number (DFN), and one of the conditions may be constantly fixed and used for the SD2DSS. In other words, the information indicated by the SD2DSS may be identified based on condition 1 and condition 2. That is, the information indicated by the SD2DSS is identified based on a sequence mapping/scrambling scheme, and thus, the information may be implicitly signaled through the SD2DSS.

As a fourth example of the first embodiment, when a synchronization source type is transmitted through an SD2DSS, an SD2DSS of condition 1 may be generated (or transmitted) or an SD2DSS of condition 2 may be generated (or transmitted), based on the synchronization source type (two types including a synchronization source for transmitting a D2DSS included in D2DSSue_net and a synchronization source for transmitting a D2DSS included in D2DSSue_oon).

As a fifth example of the first embodiment, when a duplex mode is indicated through an SD2DSS, an SD2DSS of condition 1 may be generated (or transmitted) or an SD2DSS of condition 2 may be generated (or transmitted), based on the duplex mode (whether it is an FDD mode or a TDD mode).

As a sixth example of the first embodiment, when even number/odd number information of an SFN or a DFN is indicated by an SD2DSS, an SD2DSS of condition 1 may be generated (or transmitted) or an SD2DSS of condition 2 may be generated (or transmitted), based on whether the SFN or the DFN is an even number or an odd number. For example, when the SFN or the DFN is an even number, the case of condition 1 may be fixed and used. When the SFN or the DFN is an odd number, the case of condition 2 may be fixed and used.

As a seventh example of the first embodiment, one of the condition 1 and condition 2 may be constantly fixed and used.

The fourth to seventh examples of the first embodiment may be listed up in the table provided below.

TABLE 4

| example | Information indicated by SD2DSS | Sequence mapping scheme and scrambling scheme | |
|---|---|---|---|
| | | condition 1 | condition 2 |
| Fourth | Synchronization source type | Synchronization source for transmitting D2DSS include in D2DSSue_net | Synchronization source for transmitting D2DSS include in D2DSSue_oon |
| Fifth | Duplex mode | FDD | TDD |
| Sixth | SFN or DFN number | Even number | Odd number |
| Seventh | — | condition 1 or condition 2 is constantly fixed and used | |

The conditions for the PD2DSS and the conditions for the SD2DSS may be combined and configured by taking into consideration system information for D2D. That is, a PD2DSS and an SD2DSS may be generated by combining one of the first to third examples associated with the PD2DSS and one of the fourth to seventh examples associated with the SD2DSS.

For example, the SD2DSS may be configured to be different based on a synchronization source type (two types including a synchronization source for transmitting a D2DSS included in D2DSSue_net and a synchronization source for transmitting a D2DSS included in D2DSSue_oon). In this instance, the PD2DSS may be configured to be different based on a stratum level (or a hop count) indicating the number of synchronization sources that a synchronization signal passes through from an active synchronization source. That is, in the case of the combination in the example, the SD2DSS may use the same for indicating a synchronization source type, and the PD2DSS may use the same for indicating a stratum level.

The first through third examples have been described by assuming that three new root indices for the PD2DSS exist. As another equivalent example, the case in which two new root indices (X and Y) for the PD2DSS exist will be described. In this instance, an identical root index may be mapped to each of the two symbols for the PD2DSS in a single synchronization subframe (for example, a single subframe in the period of 40 ms) for a D2DSS. In this instance, root index X may be used for condition A, and root index Y may be used for condition B.

Here, the conditions (condition A and condition B) may be defined based on information transmitted through the PD2DSS. In other words, the information indicated by the PD2DSS may be identified based on the conditions. That is, the information indicated by the PD2DSS is identified based on the root indices X and Y, and thus, the information may be implicitly signaled through the PD2DSS.

As an eighth example of the first embodiment, when a synchronization source type is transmitted through a PD2DSS, the conditions may be classified into the condition A and the condition B based on the synchronization source type (two types including a synchronization source for transmitting a D2DSS included in D2DSSue_net and a synchronization source for transmitting a D2DSS included in D2DSSue_oon).

As a ninth example of the first embodiment, when a stratum level (or a hop count) indicating the number of synchronization sources that a synchronization signal passes through from an active synchronization source, is indicated by a PD2DSS, the conditions may be classified into the condition A and the condition B, based on the stratum level.

As a tenth example of the first embodiment, when a PSSID is indicated by a PD2DSS and an SD2DSS, the conditions may be classified into the condition A and the condition B, based on the PSSID.

A sequence mapping scheme and a scrambling scheme of Equation 14 (Equation 14 is substituted for Equation 4 for an SSS) may be equally used with respect to each of the two symbols for an SD2DSS in a single synchronization subframe (for example, a single subframe in the period of 40 ms) for a D2DSS.

As described above, in Equation 14, condition 1 may be identical or similar to a sequence mapping scheme and a scrambling scheme in subframe 0 of the SSS. In Equation 14, condition 2 may be identical or similar to a sequence mapping scheme and a scrambling scheme in subframe 5 of the SSS.

That is, the equation of the upper part of each condition of Equation 14 is identical to the sequence mapping scheme and the scrambling scheme in subframe 0 or subframe 5 of the SSS.

Although the equation of the lower part of each condition of Equation 14 is identical to the sequence mapping scheme in subframe 0 or subframe 5 of the SSS, scrambling by $N_{ID}^{(2)}$ may be excluded from the scrambling scheme and only scrambling by $m_0$ or $m_1$ may be identical.

When scrambling by $N^{(2)}_{ID}$ is excluded from the scrambling scheme, Equation 8 may not be used. When scrambling by $N^{(2)}_{ID}$ is not excluded, Equation 15 provided below may be used instead of Equation 8. Equation 8 and Equation 15 may have a difference in the number of root indices. That is, in Equation 15, $N^{(2)}_{ID}$ may be two cases, that is, 0 and 1. By taking into consideration the same, the scrambling scheme may be differently configured.

$$c_0(n) = \tilde{c}((n + N_{ID}^{(2)}) \bmod 31)$$

$$c_1(n) = \tilde{c}((n + N_{ID}^{(2)} + 2) \bmod 31)$$

where $N_{ID}^{(2)} \in \{0,1\}$ [Equation 15]

In this instance, the conditions (condition 1 and condition 2) may be defined based on information transmitted through the SD2DSS, one of the conditions may be fixed and used for the SD2DSS based on a System Frame Number (SFN) or a D2D Frame Number (DFN), and one of the conditions may be constantly fixed and used for the SD2DSS. Here, for the sequence mapping scheme and the scrambling scheme, the conditions associated with the fourth to the seventh examples of the first embodiment and information indicated by each condition may be equally applied.

For example, 1) the conditions may be classified into condition 1 and condition 2 based on a synchronization source type (two types including a synchronization source for transmitting a D2DSS included in D2DSSue_net and a synchronization source for transmitting a D2DSS included in D2DSSue_oon).

As another example, 2) the conditions may be classified into condition 1 and condition 2 based on a duplex mode (whether it is FDD or TDD).

As another example, 3) when the SFN or the DFN is an even number, the case of condition 1 may be fixed and used. When the SFN or the DFN is an odd number, the case of condition 2 may be fixed and used.

As another example, one of the condition 1 and condition 2 may be constantly fixed and used.

Second Embodiment

Figure 5:
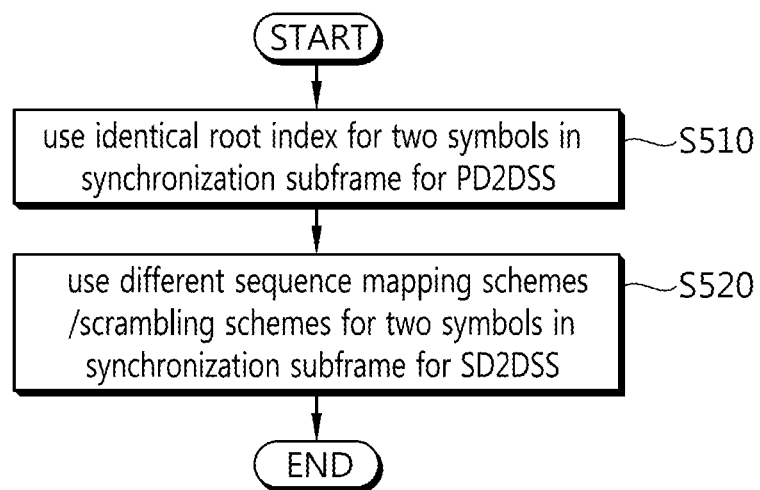
FIG. 5 is a flowchart illustrating a synchronization method for D2D communication according to one or more exemplary embodiments.

FIG. 5 is a flowchart illustrating a synchronization method for D2D communication according to one or more exemplary embodiments.

Referring to FIG. 5, in the case of a PD2DSS, an identical root index is used for two symbols for a PD2DSS in a synchronization subframe in operation S510. That is, a synchronization source may generate the PD2DSS using the identical root index for the two symbols in the synchronization subframe, and may transmit the same to a synchronization target UE.

In the case of an SD2DSS, different sequence mapping schemes and scrambling schemes may be used for the two symbols for an SD2DSS in the synchronization subframe, in operation S520.

Each operation of this flowchart will be described in detail as follows.

First, operation S510 corresponds to the case where three root indices (X, Y, and Z) for the PD2DSS are used. In this instance, the synchronization source may map an identical root index to each of the two symbols for the PD2DSS in a single synchronization subframe (for example, a single subframe in the period of 40 ms) for a D2DSS. In this instance, a root index to be used may be determined based on a predetermined condition. For example, root index X may be used for condition A, root index Y may be used for condition B, and root index Z may be used for condition C.

Here, the conditions (condition A, condition B, and condition C) may be defined based on information transmitted through a PD2DSS. In other words, the information indicated through the PD2DSS may be identified based on the conditions. That is, the information indicated through the PD2DSS is identified based on the root indices X, Y, and Z, and thus, the information may be implicitly signaled through the PD2DSS.

According to the first example of the second embodiment, when a synchronization source type is transmitted through a PD2DSS, the conditions may be classified into condition A, condition B, and condition C, based on the synchronization source type (three types including a synchronization source for transmitting a D2DSS included in D2DSSue_net and corresponding to transmission from an in-coverage D2D UE to an out-of-coverage D2D UE, a synchronization source for transmitting a D2DSS included in D2DSSue_net and corresponding to transmission from an out-of-coverage D2D UE to an out-of-coverage D2D UE, and a synchronization source for transmitting a D2DSS included in D2DSSue_oon).

As a second example of the second embodiment, when a stratum level (or a hop count) indicating the number of synchronization sources that a synchronization signal passes through from an active synchronization source, is indicated through a PD2DSS, the conditions may be classified into condition A, condition B, and condition C, based on the stratum level.

As a third example of the second embodiment, when a PSSID is indicated through a PD2DSS and an SD2DSS, the conditions may be classified into condition A, condition B, and condition C, based on the PSSID.

The first to third examples of the second embodiment may be listed up in the table provided below.

TABLE 5

| example | Information indicated by PD2DSS | Root index | | |
|---|---|---|---|---|
| | | X | Y | Z |
| First | Synchronization source type | In-coverage synchronization source for transmitting D2DSS included in D2DSSue_net | Out-of-coverage synchronization source for transmitting D2DSS included in D2DSSue_net | Synchronization source for transmitting D2DSS included in D2DSSue_oon |
| second | Stratum level | 0 | 1 | 2 |
| third | PSSID | (PSSID)mod3 = 0 | (PSSID)mod3 = 1 | (PSSID)mod3 = 2 |

When a synchronization target UE receives the PD2DSS, the synchronization target UE may implicitly recognize a synchronization source type (in the case of the first example), a stratum level (in the case of second example), a PSSID (in the case of the third example), or the like, based on the root indices X, Y, and Z.

Subsequently, in association with operation S520, the synchronization source may use different sequence mapping schemes and different scrambling schemes, as shown in Equation 16 (Equation 16 is substituted for Equation 4 for the SSS), with respect the two symbols for the SD2DSS in the single synchronization subframe for the D2DSS. Here, condition 1 may be referred to as sequence mapping/scrambling scheme 1 and condition 2 may be referred to as sequence mapping/scrambling scheme 2, respectively.

[Equation 16]

$$d(2n) = \begin{cases} s_0^{(m_0)}(n)c_0(n) & \text{in 1st symbol for } SD2DSS \text{ within a subframe} \\ s_1^{(m_1)}(n)c_0(n) & \text{in 2nd symbol for } SD2DSS \text{ within a subframe} \end{cases}$$

$$d(2n+1) = \begin{cases} s_1^{(m_1)}(n)c_1(n)z_1^{(m_0)} & \text{in 1st symbol for } SD2DSS \text{ within a subframe} \\ s_0^{(m_0)}(n)c_1(n)z_1^{(m_1)} & \text{in 2nd symbol for } SD2DSS \text{ within a subframe} \end{cases}$$

Condition 1 or $$d(2n) = \begin{cases} s_0^{(m_0)}(n) & \text{in 1st symbol for } SD2DSS \text{ within a subframe} \\ s_1^{(m_1)}(n) & \text{in 2nd symbol for } SD2DSS \text{ within a subframe} \end{cases}$$

$$d(2n+1) = \begin{cases} s_1^{(m_1)}(n)z_1^{(m_0)} & \text{in 1st symbol for } SD2DSS \text{ within a subframe} \\ s_0^{(m_0)}(n)z_1^{(m_1)} & \text{in 2nd symbol for } SD2DSS \text{ within a subframe} \end{cases}$$

$$d(2n) = \begin{cases} s_0^{(m_0)}(n)c_0(n) & \text{in 2nd symbol for } SD2DSS \text{ within a subframe} \\ s_1^{(m_1)}(n)c_0(n) & \text{in 1st symbol for } SD2DSS \text{ within a subframe} \end{cases}$$

Condition 2

$$d(2n+1) = \begin{cases} s_1^{(m_1)}(n)c_1(n)z_1^{(m_0)} & \text{in 2nd symbol for } SD2DSS \text{ within a subframe} \\ s_0^{(m_0)}(n)c_1(n)z_1^{(m_1)} & \text{in 1st symbol for } SD2DSS \text{ within a subframe} \end{cases}$$

or $$d(2n) = \begin{cases} s_0^{(m_0)}(n) & \text{in 2nd symbol for } SD2DSS \text{ within a subframe} \\ s_1^{(m_1)}(n) & \text{in 1st symbol for } SD2DSS \text{ within a subframe} \end{cases}$$

-continued $$d(2n+1) = \begin{cases} s_1^{(m_1)}(n)z_1^{(m_0)} & \text{in } 2nd \text{ symbol for } SD2DSS \text{ within a subframe} \\ s_0^{(m_0)}(n)z_1^{(m_1)} & \text{in } 1st \text{ symbol for } SD2DSS \text{ within a subframe} \end{cases}$$

In the part of condition 1 in Equation 16, a sequence mapping scheme and a scrambling scheme in a first symbol for the SD2DSS in the single synchronization subframe may be identical or similar to a sequence mapping scheme and a scrambling scheme in subframe 0 for the SSS. A sequence mapping scheme and a scrambling scheme in a second symbol for the SD2DSS in the single synchronization subframe may be identical or similar to a sequence mapping scheme and a scrambling scheme in subframe 5 for the SSS.

In the part of condition 2 in Equation 16, a sequence mapping scheme and a scrambling scheme in a first symbol for an SD2DSS in a single synchronization subframe may be identical or similar to a sequence mapping scheme and a scrambling scheme in subframe 5 for the SSS. A sequence mapping scheme and a scrambling scheme in a second symbol for the SD2DSS in the single synchronization subframe may be identical or similar to a sequence mapping scheme and a scrambling scheme in subframe 0 for the SSS.

That is, the equation of the upper part of each condition of Equation 16 is identical to the sequence mapping scheme and the scrambling scheme in subframe 0 or subframe 5 of the SSS. Although the equation of the lower part of each condition of Equation 16 is identical to the sequence mapping scheme in subframe 0 or subframe 5 of the SSS, scrambling by $N_{ID}^{(2)}$ may be excluded from the scrambling scheme and only the scrambling by $m_0$ or $m_1$ may be identical.

When scrambling by $N^{(2)}_{ID}$ is excluded from the scrambling scheme, Equation 8 may not be used. When scrambling by $N^{(2)}_{ID}$ is not excluded, Equation 8 may be used.

In this instance, the conditions (condition 1 and condition 2) may be defined based on information transmitted through the SD2DSS, one of the conditions may be fixed and used for the SD2DSS based on a System Frame Number (SFN) or a D2D Frame Number (DFN), and one of the conditions may be constantly fixed and used for the SD2DSS. In other words, the information indicated through the SD2DSS may be identified based on condition 1 and condition 2. That is, the information indicated through the SD2DSS is identified based on a sequence mapping/scrambling scheme, and thus, the information may be implicitly signaled through the SD2DSS.

As a fourth example of the second embodiment, when a synchronization source type is transmitted through an SD2DSS, an SD2DSS of condition 1 may be generated (or transmitted) or an SD2DSS of condition 2 may be generated (or transmitted), based on the synchronization source type (two types including a synchronization source for transmitting a D2DSS included in D2DSSue_net and a synchronization source for transmitting a D2DSS included in D2DSSue_oon).

As a fifth example of the second embodiment, when a duplex mode is indicated through an SD2DSS, an SD2DSS of condition 1 may be generated (or transmitted) or an SD2DSS of condition 2 may be generated (or transmitted), based on the duplex mode (whether it is an FDD mode or a TDD mode).

As a sixth example of the second embodiment, when even number/odd number information of an SFN or a DFN is indicated through an SD2DSS, an SD2DSS of condition 1 may be generated (or transmitted) or an SD2DSS of condition 2 may be generated (or transmitted), based on whether the SFN or the DFN is an even number or an odd number. For example, when the SFN or the DFN is an even number, the case of condition 1 may be fixed and used. When the SFN or the DFN is an odd number, the case of condition 2 may be fixed and used.

As a seventh example of the second embodiment, one of the condition 1 and condition 2 may be constantly fixed and used.

The fourth to seventh examples of the second embodiment may be listed up in the table provided below.

TABLE 6

| | Information indicated by | Sequence mapping scheme and scrambling scheme | |
|---|---|---|---|
| example | SD2DSS | Condition 1 | Condition 2 |
| Fourth example | Synchronization source type | Synchronization source that transmits D2DSS included in D2DSSue_net | Synchronization source that transmits D2DSS included in D2DSSue_oon |
| Fifth example | Duplex mode | FDD | TDD |
| Sixth example | SFN or DFN number | Even number | Odd number |
| Seventh example | — | Condition 1 or condition 2 is constantly fix | |

The conditions for the PD2DSS and the conditions for the SD2DSS may be combined and configured by taking into consideration system information for D2D. That is, a PD2DSS and an SD2DSS may be generated by combining one of the first to third examples of the second embodiment associated with the PD2DSS and one of the fourth to seventh examples of the second embodiments associated with the SD2DSS.

For example, the SD2DSS may be configured to be different based on a synchronization source type (two types including a synchronization source for transmitting a D2DSS included in D2DSSue_net and a synchronization source for transmitting a D2DSS included in D2DSSue_oon). In this instance, the PD2DSS may be configured to be different based on a stratum level (or a hop count) indicating the number of synchronization sources that a synchronization signal passes through from an active synchronization source. That is, in the case of the combination in the example, the SD2DSS may use the same for indicating a synchronization source type, and the PD2DSS may use the same for indicating a stratum level.

The first through third examples have been described by assuming that three new root indices for the PD2DSS exist. As another equivalent example, the case in which two new root indices (X and Y) for the PD2DSS exist will be described. In this instance, an identical root index is mapped to each of two symbols for the PD2DSS in a single synchronization subframe for a D2DSS. In this instance, root index X may be used for condition A, and root index Y may be used for condition B.

Here, the conditions (condition A and condition B) may be defined based on information transmitted through the PD2DSS. In other words, the information indicated through the PD2DSS may be identified based on the conditions. That is, the information indicated through the PD2DSS is identified based on the root indices X and Y, and thus, the information may be implicitly signaled through the PD2DSS.

As an eighth example of the second embodiment, when a synchronization source type is transmitted through a PD2DSS, the conditions may be classified into the condition A and the condition B based on the synchronization source type (two types including a synchronization source for transmitting a D2DSS included in D2DSSue_net and a synchronization source for transmitting a D2DSS included in D2DSSue_oon).

As a ninth example of the second embodiment, when a stratum level (or a hop count) indicating the number of synchronization sources that a synchronization signal passes through from an active synchronization source, is indicated through a PD2DSS, the conditions may be classified into the condition A, and the condition B, based on the stratum level.

As a tenth example of the second embodiment, when a PSSID is indicated through a PD2DSS and an SD2DSS, the conditions may be classified into the condition A and the condition B, based on the PSSID.

Different sequence mapping schemes and different scrambling schemes may be used with respect to the two symbols for the SD2DSS in the single synchronization subframe (for example, a single subframe in the period of 40 ms) for the D2DSS, as shown in Equation 16 (Equation 16 is substituted for Equation 4 for an SSS).

As described above, in the part of condition 1 in Equation 16, a sequence mapping scheme and a scrambling scheme in a first symbol for the SD2DSS in the single synchronization subframe may be identical or similar to a sequence mapping scheme and a scrambling scheme in subframe 0 for the SSS. A sequence mapping scheme and a scrambling scheme in a second symbol for the SD2DSS in the single synchronization subframe may be identical or similar to a sequence mapping scheme and a scrambling scheme in subframe 5 for the SSS.

In the part of condition 2 in Equation 16, a sequence mapping scheme and a scrambling scheme in a first symbol for an SD2DSS in a single synchronization subframe may be identical or similar to a sequence mapping scheme and a scrambling scheme in subframe 5 for the SSS. A sequence mapping scheme and a scrambling scheme in a second symbol for the SD2DSS in the single synchronization subframe may be identical or similar to a sequence mapping scheme and a scrambling scheme in subframe 0 for the SSS.

That is, the equation of the upper part of each condition of Equation 16 is identical to the sequence mapping scheme and the scrambling scheme in subframe 0 or subframe 5 of the SSS. Although the equation of the lower part of each condition of Equation 16 is identical to the sequence mapping scheme in subframe 0 or subframe 5 of the SSS, scrambling by $N_{ID}^{(2)}$ may be excluded from the scrambling scheme and only the scrambling by $m_0$ or $m_1$ may be identical.

When scrambling by $N^{(2)}_{ID}$ is excluded from the scrambling scheme, Equation 8 may not be used. When scrambling by $N^{(2)}_{ID}$ is not excluded, Equation 17 provided below may be used instead of Equation 8. Equation 8 and Equation 17 may have a difference in the number of root indices. That is, in Equation 17, $N^{(2)}_{ID}$ may be two cases, that is, 0 and 1. By taking into consideration the same, the scrambling scheme may be differently configured.

$$c_0(n)=\tilde{c}((n+N_{ID}^{(2)}) \bmod 31)$$

$$c_1(n)=\tilde{c}((n+N_{ID}^{(2)}+2) \bmod 31)$$

where $N_{ID}^{(2)} \in \{0,1\}$ [Equation 17]

In this instance, the conditions (condition 1 and condition 2) may be defined based on information transmitted through the SD2DSS, one of the conditions may be fixed and used for the SD2DSS based on a System Frame Number (SFN) or a D2D Frame Number (DFN), and one of the conditions may be constantly fixed and used for the SD2DSS. Here, for the sequence mapping scheme and the scrambling scheme, the conditions associated with the fourth to the seventh examples of the second embodiment and information indicated by each condition may be equally applied.

For example, 1) the conditions may be classified into condition 1 and condition 2 based on a synchronization source type (two types including a synchronization source for transmitting a D2DSS included in D2DSSue_net and a synchronization source for transmitting a D2DSS included in D2DSSue_oon).

As another example, 2) the conditions may be classified into condition 1 and condition 2 based on a duplex mode (whether it is FDD or TDD).

As another example, 3) when the SFN or the DFN is an even number, the case of condition 1 may be fixed and used. When the SFN or the DFN is an odd number, the case of condition 2 may be fixed and used.

As another example, one of the condition 1 and condition 2 may be constantly fixed and used.

Third Embodiment

Figure 6:
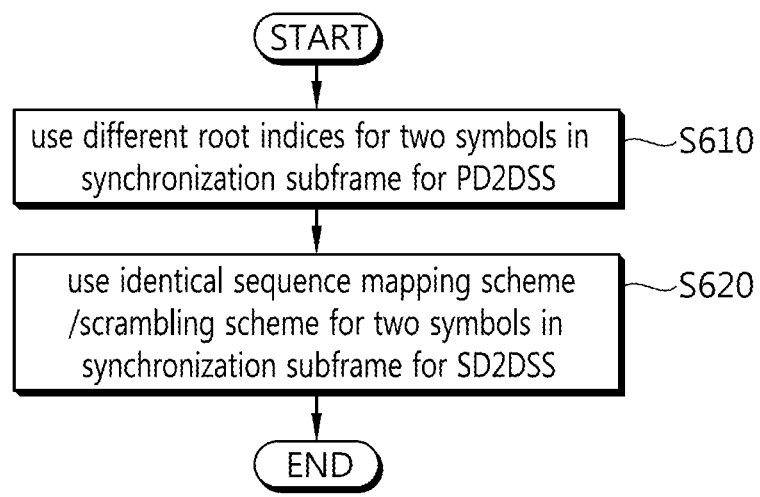
FIG. 6 is a flowchart illustrating a synchronization method for D2D communication according to one or more exemplary embodiments.

FIG. 6 is a flowchart illustrating a synchronization method for D2D communication according to one or more exemplary embodiments.

Referring to FIG. 6, in the case of a PD2DSS, different root indices are used for two symbols for a PD2DSS in a synchronization subframe in operation S610. That is, a synchronization source may generate the PD2DSS using the different root indices for the two symbols in the synchronization subframe, and may transmit the same to a synchronization target UE.

In the case of an SD2DSS, an identical sequence mapping and an identical scrambling scheme may be used for the two symbols for an SD2DSS in the synchronization subframe, in operation S620.

Each operation of this flowchart will be described in detail as follows.

First, operation S610 corresponds to the case where three root indices (X, Y, and Z) for the PD2DSS are used. In this instance, the synchronization source may map different root indices to the two symbols for the PD2DSS in a single synchronization subframe (for example, a single subframe in the period of 40 ms) for a D2DSS. For example, in the synchronization subframe of the structure identical to FIG. 2, the synchronization source may generate a sequence based on the different root indices with respect to a second symbol and a ninth symbol, and transmit a PD2DSS based on the sequence.

In this instance, a root index to be used may be determined based on a predetermined condition. For example, in the case of condition A, the synchronization source may use root index X in a first symbol in a single synchronization subframe, and may use root index Y in a second symbol (root index combination (X, Y)). As an example, in the case of condition B, the synchronization source may use root index Y in the first symbol in the single synchronization subframe, and may use root index Z in the second symbol (root index combination (Y, Z)). As an example, in the case of condition C, the synchronization source may use root index Z in the first symbol in the single synchronization subframe, and may use root index X in the second symbol (root index combination (Z, X)). Also, various embodiments may be possible, in association with a root index combination to be applied, for each condition, with respect to two symbols in a single synchronization subframe. For example, a root index combination (Y, Z) may be used for the condition A, a root index combination (Z, X) may be used for the condition B, and a root index combination (X, Y) may be used for the condition C.

Here, the conditions (condition A, condition B, and condition C) may be defined based on information transmitted through a PD2DSS. In other words, the information indicated through the PD2DSS may be identified based on the conditions. That is, the information indicated through the PD2DSS is identified based on a combination of root indices, and thus, the information may be implicitly signaled through the PD2DSS.

As a first example of the third embodiment, when a synchronization source type is transmitted through a PD2DSS, the conditions may be classified into condition A, condition B, and condition C, based on the synchronization source type (three types including a synchronization source for transmitting a D2DSS included in D2DSSue_net and corresponding to transmission from an in-coverage D2D UE to an out-of-coverage D2D UE, a synchronization source for transmitting a D2DSS included in D2DSSue_net and corresponding to transmission from an out-of-coverage D2D UE to an out-of-coverage D2D UE, and a synchronization source for transmitting a D2DSS included in D2DSSue_oon).

As a second example of the third embodiment, when a stratum level (or a hop count) indicating the number of synchronization sources that a synchronization signal passes through from an active synchronization source, is indicated through a PD2DSS, the conditions may be classified into condition A, condition B, and condition C, based on the stratum level.

As a third example of the third embodiment, when a PSSID is indicated through a PD2DSS and an SD2DSS, the conditions may be classified into condition A, condition B, and condition C, based on the PSSID.

The first to third examples of the third embodiment may be listed up in the table provided below.

second example), a PSSID (in the case of the third example), or the like, based on a root index combination.

Subsequently, in association with operation S620, the synchronization source may equally use a sequence mapping scheme and a scrambling scheme of Equation 18 (Equation 18 is substituted for Equation 4 for the SSS), with respect to each of the two symbols for the SD2DSS in the single synchronization subframe for the D2DSS. Here, condition 1 and condition 2 may be referred to as sequence mapping/scrambling scheme 1 and sequence mapping/scrambling scheme 2, respectively.

[Equation 18]

$d(2n)=s_0^{(m1)}(n)c_0(n)$ in 1st symbol and 2nd symbol for SD2DSS within a subframe $d(2n+1)=s_1^{(m1)}(n)c_1(n)z_1^{(m0)}$ in 1st symbol and 2nd symbol for SD2DSS within a subframe or $d(2n)=s_0^{(m0)}(n)$ in 1st symbol and 2nd symbol for SD2DSS within a subframe $d(2n+1)=s_1^{(m1)}(n)z_1^{(m0)}$ in 1st symbol and 2nd symbol for SD2DSS within a subframe    Condition 1:

$d(2n)=s_1^{(m1)}(n)c_0(n)$ in 1st symbol and 2nd symbol for SD2DSS within a subframe $d(2n+1)=s_0^{(m0)}(n)c_1(n)z_1^{(m1)}$ in 1st symbol and 2nd symbol for SD2DSS within a subframe or $d(2n)=s_1^{(m1)}(n)$ in 1st symbol and 2nd symbol for SD2DSS within a subframe $d(2n+1)=s_0^{(m0)}(n)z_1^{(m1)}$ in 1st symbol and 2nd symbol for SD2DSS within a subframe    Condition 2:

In Equation 18, condition 1 may be identical or similar to a sequence mapping scheme and a scrambling scheme in subframe 0 of the SSS. In Equation 18, condition 2 may be identical or similar to a sequence mapping scheme and a scrambling scheme in subframe 5 of the SSS.

That is, the equation of the upper part of each condition of Equation 18 is identical to the sequence mapping scheme and the scrambling scheme in subframe 0 or subframe 5 of the SSS. Although the equation of the lower part of each condition of Equation 18 is identical to the sequence map-

TABLE 7

| example | Information indicated by PD2DSS | root index | | |
|---|---|---|---|---|
| | | X | Y | Z |
| first | Synchronization source type | In-coverage synchronization source for transmitting D2DSS included in D2DSSue_net | Out-of-coverage synchronization source for transmitting D2DSS included in D2DSSue_net | Synchronization source for transmitting D2DSS included in D2DSSue_oon |
| second | Stratum level | 0 | 1 | 2 |
| third | PSSID | (PSSID)mod3 = 0 | (PSSID)mod3 = 1 | (PSSID)mod3 = 2 |

Referring to Table 7, when a synchronization target UE receives the PD2DSS, the synchronization target UE may implicitly recognize a synchronization source type (in the case of the first example), a stratum level (in the case of ping scheme in subframe 0 or subframe 5 of the SSS, scrambling by $N_{ID}^{(2)}$ may be excluded from the scrambling scheme and only the scrambling by $m_0$ or $m_1$ may be identical.

When scrambling by $N^{(2)}_{ID}$ is excluded from the scrambling scheme, Equation 8 may not be used. When scrambling by $N^{(2)}_{ID}$ is not excluded, Equation 19 provided below may be used instead of Equation 8. In the case of Equation 8, scrambling is executed using a single root index value, whereas, in the case of Equation 19, scrambling is executed using one selected out of the two root indices or both the two root indices.

$$c_0(n) = \tilde{c}((n+A) \bmod 31)$$

$$c_1(n) = \tilde{c}((n+B) \bmod 31)$$

or $$c_0(n) = \tilde{c}((n+A) \bmod 31)$$

$$c_1(n) = \tilde{c}((n+B+3) \bmod 31)$$

or $$c_0(n) = \tilde{c}((n+A) \bmod 31)$$

$$c_1(n) = \tilde{c}((n+A+3) \bmod 31)$$

or $$c_0(n) = \tilde{c}((n+B) \bmod 31)$$

$$c_1(n) = \tilde{c}((n+B+3) \bmod 31) \quad \text{[Equation 19]}$$

where $A = N^{(2)}_{ID\_1} \in \{0,1,2\}$ ($N^{(2)}_{ID}$ used for 1st PD2DSS symbol)

$B = N^{(2)}_{ID\_2} \in \{0,1,2\}$ ($N^{(2)}_{ID}$ used for 2nd PD2DSS symbol)

In this instance, the conditions (condition 1 and condition 2) may be defined based on information transmitted through the SD2DSS, one of the conditions may be fixed and used for the SD2DSS based on a System Frame Number (SFN) or a D2D Frame Number (DFN), and one of the conditions may be constantly fixed and used for the SD2DSS. In other words, the information indicated through the SD2DSS may be identified based on condition 1 and condition 2. That is, the information indicated through the SD2DSS is identified based on a sequence mapping/scrambling scheme, and thus, the information may be implicitly signaled through the SD2DSS.

As a fourth example of the third embodiment, when a synchronization source type is transmitted through an SD2DSS, an SD2DSS of condition 1 may be generated (or transmitted) or an SD2DSS of condition 2 may be generated (or transmitted), based on the synchronization source type (two types including a synchronization source for transmitting a D2DSS included in D2DSSue_net and a synchronization source for transmitting a D2DSS included in D2DSSue_oon).

As a fifth example of the third embodiment, when a duplex mode is indicated through an SD2DSS, an SD2DSS of condition 1 may be generated (or transmitted) or an SD2DSS of condition 2 may be generated (or transmitted), based on the duplex mode (whether it is an FDD mode or a TDD mode).

As a sixth example of the third embodiment, when even number/odd number information of an SFN or a DFN is indicated through an SD2DSS, an SD2DSS of condition 1 may be generated (or transmitted) or an SD2DSS of condition 2 may be generated (or transmitted), based on whether the SFN or the DFN is an even number or an odd number. For example, when the SFN or the DFN is an even number, the case of condition 1 may be fixed and used. When the SFN or the DFN is an odd number, the case of condition 2 may be fixed and used.

As a seventh example of the third embodiment, one of the condition 1 and condition 2 may be constantly fixed and used.

TABLE 8

| Example | Information indicated by SD2DSS | Sequence mapping scheme and scrambling scheme | |
|---|---|---|---|
| | | Condition 1 | Condition 2 |
| fourth | Synchronization source type | Synchronization source for transmitting D2DSS included in D2DSSue_net | Synchronization source for transmitting D2DSS included in D2DSSue_oon |
| fifth | Duplex mode | FDD | TDD |
| Sixth | SFN or DFN number | Even number | Odd number |
| seventh | — | condition 1 or condition 2 is constantly fixed | |

The conditions for the PD2DSS and the conditions for the SD2DSS may be combined and configured by taking into consideration system information for D2D. That is, a PD2DSS and an SD2DSS may be generated by combining one of the first to third examples of the third embodiment associated with the PD2DSS and one of the fourth to seventh examples of the third embodiments associated with the SD2DSS.

For example, the SD2DSS may be configured to be different based on a synchronization source type (two types including a synchronization source for transmitting a D2DSS included in D2DSSue_net and a synchronization source for transmitting a D2DSS included in D2DSSue_oon). In this instance, the PD2DSS may be configured to be different based on a stratum level (or a hop count) indicating the number of synchronization sources that a synchronization signal passes through from an active synchronization source. That is, in the case of the combination in the example, the SD2DSS may use the same for indicating a synchronization source type, and the PD2DSS may use the same for indicating a stratum level.

The first through third examples have been described by assuming that three new root indices for the PD2DSS exist. As another equivalent example, the case in which two new root indices (X and Y) for the PD2DSS exist will be described. In this instance, different root indices are mapped to the two symbols for the PD2DSS in a single synchronization subframe for a D2DSS.

For example, in the case of condition A, a synchronization source may use root index X in a first symbol in a single synchronization subframe, and may use root index Y in a second symbol. As an example, in the case of condition B, the synchronization source may use root index Y in the first symbol in the single synchronization subframe, and may use root index X in the second symbol (root index combination (Y, X)).

Here, the conditions (condition A and condition B) may be defined based on information transmitted through the PD2DSS. In other words, the information indicated through the PD2DSS may be identified based on the conditions. That is, the information indicated through the PD2DSS is identified based on a combination of root indices, and thus, the information may be implicitly signaled through the PD2DSS.

As an eighth example of the third embodiment, when a synchronization source type is transmitted through a PD2DSS, the conditions may be classified into the condition A and the condition B based on the synchronization source type (two types including a synchronization source for transmitting a D2DSS included in D2DSSue_net and a synchronization source for transmitting a D2DSS included in D2DSSue_oon).

As a ninth example of the third embodiment, when a stratum level (or a hop count) indicating the number of synchronization sources that a synchronization signal passes through from an active synchronization source, is indicated through a PD2DSS, the conditions may be classified into the condition A, and the condition B, based on the stratum level.

As a tenth example of the third embodiment, when a PSSID is indicated through a PD2DSS and an SD2DSS, the conditions may be classified into the condition A and the condition B, based on the PSSID.

A sequence mapping scheme and a scrambling scheme of Equation 18 (Equation 18 is substituted for Equation 4 for an SSS) may be equally used with respect to each of the two symbols for an SD2DSS in a single subframe (for example, a single subframe in the period of 40 ms) for a D2DSS.

In Equation 18, condition 1 may be identical or similar to a sequence mapping scheme and a scrambling scheme in subframe 0 of the SSS. In Equation 18, condition 2 may be identical or similar to a sequence mapping scheme and a scrambling scheme in subframe 5 of the SSS.

That is, the equation of the upper part of each condition of Equation 18 is identical to the sequence mapping scheme and the scrambling scheme in subframe 0 or subframe 5 of the SSS.

Although the equation of the lower part of each condition of Equation 18 is identical to the sequence mapping scheme in subframe 0 or subframe 5 of the SSS, scrambling by $N_{ID}^{(2)}$ may be excluded from the scrambling scheme and only the scrambling by $m_0$ or $m_1$ may be identical.

When scrambling by $N^{(2)}_{ID}$ is excluded from the scrambling scheme, Equation 8 may not be used. When scrambling by $N^{(2)}_{ID}$ is not excluded, Equation 20 provided below may be used instead of Equation 8. In the case of Equation 8, scrambling is executed using a single root index value, whereas, in the case of Equation 20, scrambling is executed using one selected out of the two root indices or both the two root indices.

Additionally, Equation 8 and Equation 20 may have a difference in the number of root indices. That is, in Equation 20, $N^{(2)}_{ID}$ may be two cases, that is, 0 and 1. By taking into consideration the same, the scrambling scheme may be differently configured.

$c_0(n) = \tilde{c}((n+A) \bmod 31)$ $c_1(n) = \tilde{c}((n+B) \bmod 31)$ or $c_0(n) = \tilde{c}((n+A) \bmod 31)$ $c_1(n) = \tilde{c}((n+B+2) \bmod 31)$ or $c_0(n) = \tilde{c}((n+A) \bmod 31)$ $c_1(n) = \tilde{c}((n+A+2) \bmod 31)$ or $c_0(n) = \tilde{c}((n+B) \bmod 31)$ $c_1(n) = \tilde{c}((n+B+2) \bmod 31)$   [Equation 20]

where $A = N_{ID\_1}^{(2)} \in \{0,1\}$ ($N_{ID}^{(2)}$ used for 1st PD2DSS symbol)

$B = N_{ID\_2}^{(2)} \in \{0,1\}$ ($N_{ID}^{(2)}$ used for 2nd PD2DSS symbol)

In this instance, the conditions (condition 1 and condition 2) may be defined based on information transmitted through the SD2DSS, as described above, one of the conditions may be fixed and used for the SD2DSS based on a System Frame Number (SFN) or a D2D Frame Number (DFN), and one of the conditions may be constantly fixed and used for the SD2DSS. Here, for the sequence mapping scheme and the scrambling scheme, the conditions associated with the fourth to the seventh examples of the third embodiment and information indicated by each condition may be equally applied.

For example, 1) the conditions may be classified into condition 1 and condition 2 based on a synchronization source type (two types including a synchronization source for transmitting a D2DSS included in D2DSSue_net and a synchronization source for transmitting a D2DSS included in D2DSSue_oon).

As another example, 2) the conditions may be classified into condition 1 and condition 2 based on a duplex mode (whether it is FDD or TDD).

As another example, 3) when the SFN or the DFN is an even number, the case of condition 1 may be fixed and used. When the SFN or the DFN is an odd number, the case of condition 2 may be fixed and used.

As another example, one of the condition 1 and condition 2 may be constantly fixed and used.

Fourth Embodiment

Figure 7:
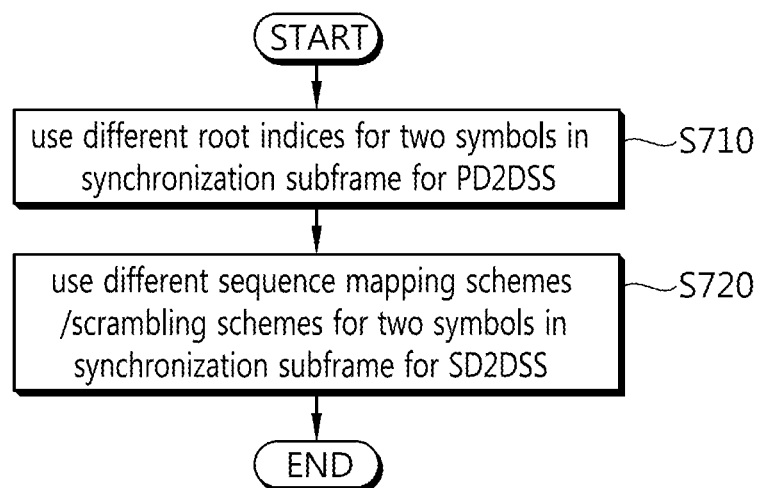
FIG. 7 is a flowchart illustrating a synchronization method for D2D communication according to one or more exemplary embodiments.

FIG. 7 is a flowchart illustrating a synchronization method for D2D communication according to one or more exemplary embodiments.

Referring to FIG. 7, in the case of a PD2DSS, different root indices are used for two symbols for a PD2DSS in a synchronization subframe in operation S710. That is, a synchronization source may generate the PD2DSS using the different root indices for the two symbols in the synchronization subframe, and may transmit the same to a synchronization target UE.

In the case of an SD2DSS, different sequence mapping schemes and different scrambling schemes may be used for the two symbols for an SD2DSS in the synchronization subframe, in operation S720.

Each operation of this flowchart will be described in detail as follows.

First, operation S710 corresponds to the case where three root indices (X, Y, and Z) for the PD2DSS are used. In this instance, the synchronization source may map different root indices to the two symbols for the PD2DSS in a single synchronization subframe for a D2DSS. For example, in the synchronization subframe of the structure identical to FIG. 2, the synchronization source may generate a sequence based on the different root indices with respect to a second symbol and a ninth symbol, and transmit a PD2DSS based on the sequence.

In this instance, a root index to be used may be determined based on a predetermined condition.

For example, in the case of condition A, a synchronization source may use root index X in a first symbol in a single synchronization subframe, and may use root index Y in a second symbol (root index combination (X, Y)). As an example, in the case of condition B, the synchronization source may use root index Y in the first symbol in the single synchronization subframe, and may use root index Z in the second symbol (root index combination (Y, Z)). As another example, in the case of condition C, the synchronization source may use root index Z in the first symbol in the single synchronization subframe, and may use root index X in the second symbol (root index combination (Z, X)). Also, various embodiments may be possible, in association with a root index combination to be applied, for each condition, with respect to two symbols in a single synchronization subframe. For example, root index combination (Y, Z) may be used for the condition A, root index combination (Z, X) may be used for the condition B, and root index combination (X, Y) may be used for the condition C.

Here, the conditions (condition A, condition B, and condition C) may be defined based on information transmitted through a PD2DSS. In other words, the information indicated through the PD2DSS may be identified based on the conditions. That is, the information indicated through the PD2DSS is identified based on a combination of root indices, and thus, the information may be implicitly signaled through the PD2DSS.

As a first example of the fourth embodiment, when a synchronization source type is transmitted through a PD2DSS, the conditions may be classified into condition A, condition B, and condition C, based on the synchronization source type (three types including a synchronization source for transmitting a D2DSS included in D2DSSue_net and corresponding to transmission from an in-coverage D2D UE to an out-of-coverage D2D UE, a synchronization source for transmitting a D2DSS included in D2DSSue_net and corresponding to transmission from an out-of-coverage D2D UE to an out-of-coverage D2D UE, and a synchronization source for transmitting a D2DSS included in D2DSSue_oon).

As a second example of the fourth embodiment, when a stratum level (or a hop count) indicating the number of synchronization sources that a synchronization signal passes through from an active synchronization source, is indicated through a PD2DSS, the conditions may be classified into condition A, condition B, and condition C, based on the stratum level.

As a third example of the fourth embodiment, when a PSSID is indicated through a PD2DSS and an SD2DSS, the conditions may be classified into condition A, condition B, and condition C, based on the PSSID.

The first to third examples of the fourth embodiment may be listed up in the table provided below.

TABLE 9

| Example | Information indicated by PD2DSS | Root index | | |
|---|---|---|---|---|
| | | X | Y | Z |
| First | Synchronization source type | In-coverage synchronization source for transmitting D2DSS included in D2DSSue_net | Out-of-coverage synchronization source for transmitting D2DSS included in D2DSSue_net | Synchronization source for transmitting D2DSS included in D2DSSue_oon |
| Second | Stratum level | 0 | 1 | 2 |
| third | PSSID | (PSSID)mod3 = 0 | (PSSID)mod3 = 1 | (PSSID )mod3 = 2 |

Referring to Table 9, when a synchronization target UE receives the PD2DSS, the synchronization target UE may implicitly recognize a synchronization source type (in the case of the first example), a stratum level (in the case of second example), a PSSID (in the case of the third example), or the like, based on a root index combination.

Subsequently, in association with operation S720, the synchronization source may use different sequence mapping schemes and different scrambling schemes with respect to the two symbols for the SD2DSS in the single synchronization subframe for the D2DSS, as shown in Equation 21 (Equation 21 is substituted for Equation 4 for the SSS). Here, condition 1 may be referred to as sequence mapping/scrambling scheme 1 and condition 2 may be referred to as sequence mapping/scrambling scheme 2, respectively.

[Equation 21]

$$d(2n) = \begin{cases} s_0^{(m_0)}(n)c_0(n) & \text{in 1st symbol for } SD2DSS \text{ within a subframe} \\ s_1^{(m_1)}(n)c_0(n) & \text{in 2nd symbol for } SD2DSS \text{ within a subframe} \end{cases} \quad \text{Condition 1}$$

$$d(2n+1) = \begin{cases} s_1^{(m_1)}(n)c_1(n)z_1^{(m_0)} & \text{in 1st symbol for } SD2DSS \text{ within a subframe} \\ s_0^{(m_0)}(n)c_1(n)z_1^{(m_1)} & \text{in 2nd symbol for } SD2DSS \text{ within a subframe} \end{cases}$$

or

-continued $$d(2n) = \begin{cases} s_0^{(m_0)}(n) & \text{in 1st symbol for SD2DSS within a subframe} \\ s_1^{(m_1)}(n) & \text{in 2nd symbol for SD2DSS within a subframe} \end{cases}$$

$$d(2n+1) = \begin{cases} s_1^{(m_1)}(n)z_1^{(m_0)} & \text{in 1st symbol for SD2DSS within a subframe} \\ s_0^{(m_0)}(n)z_1^{(m_1)} & \text{in 2nd symbol for SD2DSS within a subframe} \end{cases}$$

$$d(2n) = \begin{cases} s_0^{(m_0)}(n)c_0(n) & \text{in 2nd symbol for SD2DSS within a subframe} \\ s_1^{(m_1)}(n)c_0(n) & \text{in 1st symbol for SD2DSS within a subframe} \end{cases}$$

Condition 2

$$d(2n+1) = \begin{cases} s_1^{(m_1)}(n)c_1(n)z_1^{(m_0)} & \text{in 2nd symbol for SD2DSS within a subframe} \\ s_0^{(m_0)}(n)c_1(n)z_1^{(m_1)} & \text{in 1st symbol for SD2DSS within a subframe} \end{cases}$$

or $$d(2n) = \begin{cases} s_0^{(m_0)}(n) & \text{in 2nd symbol for SD2DSS within a subframe} \\ s_1^{(m_1)}(n) & \text{in 1st symbol for SD2DSS within a subframe} \end{cases}$$

$$d(2n+1) = \begin{cases} s_1^{(m_1)}(n)z_1^{(m_0)} & \text{in 2nd symbol for SD2DSS within a subframe} \\ s_0^{(m_0)}(n)z_1^{(m_1)} & \text{in 1st symbol for SD2DSS within a subframe} \end{cases}$$

In the part of condition 1 in Equation 21, a sequence mapping scheme and a scrambling scheme in a first symbol for the SD2DSS in the single synchronization subframe may be identical or similar to a sequence mapping scheme and a scrambling scheme in subframe 0 for the SSS. A sequence mapping scheme and a scrambling scheme in a second symbol for the SD2DSS in the single synchronization subframe may be identical or similar to a sequence mapping scheme and a scrambling scheme in subframe 5 for the SSS.

In the part of condition 2 in Equation 21, a sequence mapping scheme and a scrambling scheme in a first symbol for the SD2DSS in the single synchronization subframe may be identical or similar to a sequence mapping scheme and a scrambling scheme in subframe 5 for the SSS. A sequence mapping scheme and a scrambling scheme in a second symbol for the SD2DSS in the single synchronization subframe may be identical or similar to a sequence mapping scheme and a scrambling scheme in subframe 0 for the SSS.

That is, the equation of the upper part of each condition of Equation 21 is identical to the sequence mapping scheme and the scrambling scheme in subframe 0 or subframe 5 of the SSS. Although the equation of the lower part of each condition of Equation 21 is identical to the sequence mapping scheme in subframe 0 or subframe 5 of the SSS, scrambling by $N_{ID}^{(2)}$ may be excluded from the scrambling scheme and only the scrambling by $m_0$ or $m_1$ may be identical.

When scrambling by $N^{(2)}_{ID}$ is excluded from the scrambling scheme, Equation 8 may not be used. When scrambling by $N^{(2)}_{ID}$ is not excluded, Equation 22 provided below may be used instead of Equation 8. In the case of Equation 8, scrambling is executed using a single root index value, whereas, in the case of Equation 22, scrambling is executed using one selected out of the two root indices or both the two root indices.

$c_0(n) = \tilde{c}((n+A) \bmod 31)$ $c_1(n) = \tilde{c}((n+B) \bmod 31)$ or $c_0(n) = \tilde{c}((n+A) \bmod 31)$ $c_1(n) = \tilde{c}((n+B+3) \bmod 31)$ or $c_0(n) = \tilde{c}((n+A) \bmod 31)$ $c_1(n) = \tilde{c}((n+A+3) \bmod 31)$ or $c_0(n) = \tilde{c}((n+B) \bmod 31)$ $c_1(n) = \tilde{c}((n+B+3) \bmod 31)$ [Equation 22]

where $A = N_{ID\_1}^{(2)} \in \{0,1,2\}$ ($N_{ID}^{(2)}$ used for 1st PD2DSS symbol)

$B = N_{ID\_2}^{(2)} \in \{0,1,2\}$ ($N_{ID}^{(2)}$ used for 2nd PD2DSS symbol)

In this instance, the conditions (condition 1 and condition 2) may be defined based on information transmitted through the SD2DSS, one of the conditions may be fixed and used for the SD2DSS based on a System Frame Number (SFN) or a D2D Frame Number (DFN), and one of the conditions may be constantly fixed and used for the SD2DSS.

In other words, the information indicated through the SD2DSS may be identified based on condition 1 and condition 2. That is, the information indicated through the SD2DSS is identified based on a sequence mapping/scrambling scheme, and thus, the information may be implicitly signaled through the SD2DSS.

As a fourth example of the fourth embodiment, when a synchronization source type is transmitted through an SD2DSS, an SD2DSS of condition 1 may be generated (or transmitted) or an SD2DSS of condition 2 may be generated (or transmitted), based on the synchronization source type (two types including a synchronization source for transmitting a D2DSS included in D2DSSue_net and a synchronization source for transmitting a D2DSS included in D2DSSue_oon).

As a fifth example of the fourth embodiment, when a duplex mode is indicated through an SD2DSS, an SD2DSS of condition 1 may be generated (or transmitted) or an SD2DSS of condition 2 may be generated (or transmitted), based on the duplex mode (whether it is an FDD mode or a TDD mode).

As a sixth example of the fourth embodiment, when even number/odd number information of an SFN or a DFN is indicated through an SD2DSS, an SD2DSS of condition 1 may be generated (or transmitted) or an SD2DSS of condition 2 may be generated (or transmitted), based on whether the SFN or the DFN is an even number or an odd number. For example, when the SFN or the DFN is an even number, the case of condition 1 may be fixed and used. When the SFN or the DFN is an odd number, the case of condition 2 may be fixed and used.

As a seventh example of the fourth embodiment, one of the condition 1 and condition 2 may be constantly fixed and used.

The fourth to seventh examples of the fourth embodiment may be listed up in the table provided below.

TABLE 10

| example | Information indicated by SD2DSS | Sequence mapping scheme and scrambling scheme | |
|---|---|---|---|
| | | condition 1 | condition 2 |
| Fourth | synchronization source type | Synchronization source for transmitting D2DSS included in D2DSSue_net | Synchronization source for transmitting D2DSS included in D2DSSue_oon |
| Fifth | duplex mode | FDD | TDD |
| Sixth | SFN or DFN number | Even number | Odd number |
| Seventh | — | condition 1 or condition 2 is constantly fixed | |

The conditions for the PD2DSS and the conditions for the SD2DSS may be combined and configured by taking into consideration system information for D2D. That is, a PD2DSS and an SD2DSS may be generated by combining one of the first to third examples of the fourth embodiment associated with the PD2DSS and one of the fourth to seventh examples of the fourth embodiments associated with the SD2DSS.

For example, the SD2DSS may be configured to be different based on a synchronization source type (two types including a synchronization source for transmitting a D2DSS included in D2DSSue_net and a synchronization source for transmitting a D2DSS included in D2DSSue_oon). In this instance, the PD2DSS may be configured to be different based on a stratum level (or a hop count) indicating the number of synchronization sources that a synchronization signal passes through from an active synchronization source. That is, in the case of the combination in the example, the SD2DSS may use the same for indicating a synchronization source type, and the PD2DSS may use the same for indicating a stratum level.

The first through third examples have been described by assuming that three new root indices for the PD2DSS exist. As another equivalent example, the case in which two new root indices (X and Y) for the PD2DSS exist will be described. In this instance, different root indices are mapped to the two symbols for the PD2DSS in a single synchronization subframe for a D2DSS.

For example, in the case of condition A, the synchronization source may use root index X in a first symbol in a single synchronization subframe, and may use root index Y in a second symbol (root index combination (X, Y)). As an example, in the case of condition B, the synchronization source may use root index Y in the first symbol in the single synchronization subframe, and may use root index X in the second symbol (root index combination (Y, X)).

Here, the conditions (condition A and condition B) may be defined based on information transmitted through the PD2SS. In other words, the information indicated through the PD2DSS may be identified based on the conditions. That is, the information indicated through the PD2DSS is identified based on a combination of root indices, and thus, the information may be implicitly signaled through the PD2DSS.

As an eighth example of the fourth embodiment, when a synchronization source type is transmitted through a PD2DSS, the conditions may be classified into the condition A and the condition B based on the synchronization source type (two types including a synchronization source for transmitting a D2DSS included in D2DSSue_net and a synchronization source for transmitting a D2DSS included in D2DSSue_oon).

As a ninth example of the fourth embodiment, when a stratum level (or a hop count) indicating the number of synchronization sources that a synchronization signal passes through from an active synchronization source, is indicated through a PD2DSS, the conditions may be classified into the condition A, and the condition B, based on the stratum level.

As a tenth example of the fourth embodiment, when a PSSID is indicated through a PD2DSS and an SD2DSS, the conditions may be classified into the condition A and the condition B, based on the PSSID.

Different sequence mapping schemes and different scrambling schemes may be used with respect to the two symbols for an SD2DSS in a single synchronization subframe (for example, a single subframe in the period of 40 ms) for a D2DSS, as shown in Equation 21 (Equation 21 is substituted for Equation 4 for an SSS).

As described above, in the part of condition 1 in Equation 21, a sequence mapping scheme and a scrambling scheme in a first symbol for the SD2DSS in the single synchronization subframe may be identical or similar to a sequence mapping scheme and a scrambling scheme in subframe 0 for the SSS. A sequence mapping scheme and a scrambling scheme in a second symbol for the SD2DSS in the single synchronization subframe may be identical or similar to a sequence mapping scheme and a scrambling scheme in subframe 5 for the SSS.

In the part of condition 2 in Equation 21, a sequence mapping scheme and a scrambling scheme in a first symbol for the SD2DSS in the single synchronization subframe may be identical or similar to a sequence mapping scheme and a scrambling scheme in subframe 5 for the SSS. A sequence mapping scheme and a scrambling scheme in a second symbol for the SD2DSS in the single synchronization subframe may be identical or similar to a sequence mapping scheme and a scrambling scheme in subframe 0 for the SSS.

That is, the equation of the upper part of each condition of Equation 21 is identical to the sequence mapping scheme and the scrambling scheme in subframe 0 or subframe 5 of the SSS. Although the equation of the lower part of each condition of Equation 21 is identical to the sequence mapping scheme in subframe 0 or subframe 5 of the SSS, scrambling by $N_{ID}^{(2)}$ may be excluded and only scrambling by $m_0$ or $m_1$ may be identical.

When scrambling by $N^{(2)}_{ID}$ is excluded from the scrambling scheme, Equation 8 may not be used. When scrambling by $N^{(2)}_{ID}$ is not excluded, Equation 23 provided below may be used instead of Equation 8. In the case of Equation 8, scrambling is executed using a single root index value, whereas, in the case of Equation 23, scrambling is executed using one selected out of the two root indices or both the two root indices. Additionally, Equation 8 and Equation 23 may have a difference in the number of root indices. That is, in Equation 23, $N^{(2)}_{ID}$ may be two cases, that is, 0 and 1. By taking into consideration the same, the scrambling scheme may be differently configured.

$$c_0(n)=\tilde{c}((n+A) \bmod 31)$$

$$c_1(n)=\tilde{c}(n+B) \bmod 31)$$

or $$c_0(n)=\tilde{c}((n+A) \bmod 31)$$

$$c_1(n)=\tilde{c}((n+B+2) \bmod 31)$$

or $$c_0(n)=\tilde{c}((n+A) \bmod 31)$$

$$c_1(n)=\tilde{c}((n+A+2) \bmod 31)$$

or $$c_0(n)=\tilde{c}((n+B) \bmod 31)$$

$$c_1(n)=\tilde{c}((n+B+2) \bmod 31) \quad \text{[Equation 23]}$$

where $A=N_{ID\_1}^{(2)} \in \{0,1\}$ ($N_{ID}^{(2)}$ used for 1st PD2DSS symbol)

$B=N_{ID\_2}^{(2)} \in \{0,1\}$ ($N_{ID}^{(2)}$ used for 2nd PD2DSS symbol)

In this instance, the conditions (condition 1 and condition 2) may be defined based on information transmitted through the SD2DSS, one of the conditions may be fixed and used for the SD2DSS based on a System Frame Number (SFN) or a D2D Frame Number (DFN), and one of the conditions may be constantly fixed and used for the SD2DSS. Here, for the sequence mapping scheme and the scrambling scheme, the conditions associated with the fourth to the seventh examples of the fourth embodiment and information indicated by each condition may be equally applied.

For example, 1) the conditions may be classified into condition 1 and condition 2 based on a synchronization source type (two types including a synchronization source for transmitting a D2DSS included in D2DSSue_net and a synchronization source for transmitting a D2DSS included in D2DSSue_oon).

As another example, 2) the conditions may be classified into condition 1 and condition 2 based on a duplex mode (whether it is FDD or TDD).

As another example, 3) when the SFN or the DFN is an even number, the case of condition 1 may be fixed and used. When the SFN or the DFN is an odd number, the case of condition 2 may be fixed and used.

As another example, one of the condition 1 and condition 2 may be constantly fixed and used.

FIG. 8 is a block diagram illustrating UEs that execute D2D communication according to one or more exemplary embodiments.

Referring to FIG. 8, a first UE 800 and a second UE 850 execute D2D communication.

The first UE 800 includes a processor 810, an Radio Frequency (RF) unit 820, and a memory 825. The processor 810 may be formed of a sequence mapping unit 811 and a scrambling sequence generating unit 812.

The processor 810 may implement the proposed functions, processes, and/or methods. Particularly, the processor 810 may execute D2D communication with the second UE 850 through all operations of a D2D UE disclosed in FIGS. 3 to 7, and a procedure of applying a root index to a PD2DSS so as to map a sequence, and applying scrambling to an SD2DSS so as to map a sequence.

In particular, the sequence mapping unit 811 may execute sequence mapping by applying a root index with respect to two symbols through which a PD2DSS is transmitted in a synchronization subframe, and may execute sequence mapping in which scrambling is applied with respect to two symbols through which the SD2DSS is transmitted. Here, the sequence mapping unit 811 may apply a root index under different conditions A, B, and C, based on information indicated by the PD2DSS, and may execute sequence mapping in which scrambling is applied, under different conditions ① and ② based on information indicated by the SD2DSS.

As an example, the sequence mapping unit 811 may execute sequence mapping by applying an identical root index with respect to two symbols through which the PD2DSS is transmitted. Here, the conditions A, B, and C may be conditions of which identical root indices are X, Y, and Z, respectively.

As another example, the sequence mapping unit 811 may execute sequence mapping by applying a root index combination formed of two different root indices with respect to two symbols through which the PD2DSS is transmitted. In this instance, the condition A has a combination of X and Y as the root index combination. The condition B has a combination of Y and Z as the root index combination. The condition C has a combination of Z and X as the root index combination.

As another example, the sequence mapping unit 811 may execute sequence mapping in which scrambling is equally applied to the two symbols through which the SD2DSS is transmitted. In this instance, the condition 1 has a sequence mapping scheme for an SSS (secondary synchronization signal) in subframe 0 as the sequence mapping in which scrambling is applied. The condition 2 has a sequence mapping scheme for an SSS in subframe 5 as the sequence mapping scheme in which scrambling is applied.

As another example, the sequence mapping unit 811 may execute sequence mapping in which scrambling is differently applied to the two symbols (a first symbol and a second symbol) through which the SD2DSS is transmitted. In this instance, the condition 1 has sequence mapping schemes for the SSS in subframe 0 and subframe 5, respectively, as the sequence mapping in which scrambling is applied with respect to the first symbol and the second symbol. The condition 2 has sequence mapping schemes for the SSS in subframe 5 and subframe 0, respectively, as the sequence mapping in which scrambling is applied with respect to the first symbol and the second symbol.

The memory 825 is connected to the processor 810, and stores various pieces of information for driving the processor 810. The RF unit 820 is connected to the processor 810, and transmits and/or receives a wireless signal. For example, the RF unit 820 may transmit a PD2DSS and/or an SD2DSS to the second UE 850, or may receive a PD2DSS and/or an SD2DSS from the second UE 850.

The second UE 850 may have a structure identical to the first UE 800, and may transmit or receive a PD2DSS and/or an SD2DSS to/from the first UE 800.

According to one or more exemplary embodiments, a first UE supporting a D2D communication with a second UE may include a wireless transceiver to receive, at a first UE, a D2D synchronization signal transmitted from the second UE, the D2D synchronization signal including a primary D2D synchronization signal (PD2DSS) and a secondary D2D synchronization signal (SD2DSS). The first UE may further include a processor configured to determine a root index based on the received PD2DSS, and determine a type of a synchronization source based on the root index. The root index corresponds to an integer value X when the type of synchronization source is associated with D2DSSue_net. The root index corresponds to an integer value Y when the type of synchronization source is associated with D2DSSue_oon. Each of the integer value X and integer value Y is not an element of a set {25, 29, 34}.

The PD2DSS may be transmitted in two Single Carrier-Frequency Division Multiplexing (SC-FDM) symbols in a same subframe. The integer value X may be used for the PD2DSS transmitted in the two SC-FDM symbols. The integer value Y may be used for the PD2DSS transmitted in the two SC-FDM symbols.

If an active synchronization source of the second UE is an Evolved NodeB, the type of synchronization source may be associated with D2DSSue_net. If the active synchronization source of the second UE is an independent synchronization source (ISS) or the second UE is an ISS, the type of synchronization source is associated with D2DSSue_oon. The SD2DSS may be transmitted in two Single Carrier-Frequency Division Multiplexing (SC-FDM) symbols in the same subframe. $N_{ID}^{(1)}$ and $N_{ID}^{(2)}$ may be used in generating the SD2DSS, where $N_{ID}^{(1)}$ may be an integer selected from {0, 1, . . . , 167}, and $N_{ID}^{(2)}$ may be 0 when the root index corresponds to the integer value X. $N_{ID}^{(2)}$ may be 1 when the root index corresponds to the integer value Y.

According to one or more exemplary embodiments, a UE supporting a D2D communication with another UE may include a processor configured to determine a root index to generate a primary D2D synchronization signal (PD2DSS), the root index being associated with a type of a synchronization source. The UE may further include a wireless transceiver to transmit a D2D synchronization signal to another UE, the D2D synchronization signal comprising the PD2DSS and a secondary D2D synchronization signal (SD2DSS). The root index corresponds to an integer value X when the type of synchronization source is associated with D2DSSue_net. The root index corresponds to an integer value Y when the type of synchronization source is associated with D2DSSue_oon. Each of the integer value X and integer value Y is not an element of a set {25, 29, 34}.

The PD2DSS may be transmitted in two Single Carrier-Frequency Division Multiplexing (SC-FDM) symbols in a same subframe. The integer value X may be used for the PD2DSS transmitted in the two SC-FDM symbols. The integer value Y may be used for the PD2DSS transmitted in the two SC-FDM symbols.

If an active synchronization source of the second UE is an Evolved NodeB, the type of synchronization source may be associated with D2DSSue_net. If the active synchronization source of the second UE is an independent synchronization source (ISS) or the second UE is an ISS, the type of synchronization source is associated with D2DSSue_oon. The SD2DSS may be transmitted in two Single Carrier-Frequency Division Multiplexing (SC-FDM) symbols in the same subframe. $N_{ID}^{(1)}$ and $N_{ID}^{(2)}$ may be used in generating the SD2DSS, where $N_{ID}^{(1)}$ may be an integer selected from {0, 1, . . . , 167}, and $N_{ID}^{(2)}$ may be 0 when the root index corresponds to the integer value X. $N_{ID}^{(2)}$ may be 1 when the root index corresponds to the integer value Y.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:
1. A first wireless user device comprising:
at least one processor; and
memory storing instructions that, when executed by the at least one processor, cause the first wireless user device to:
receive, from a second wireless user device, one or more wireless signals for direct communication between wireless user devices, wherein the one or more wireless signals comprises a primary synchronization signal and a secondary synchronization signal;
determine, based on the primary synchronization signal, a root index associated with the primary synchronization signal, wherein the root index associated with the primary synchronization signal corresponds to one of a plurality of integer values, wherein each of the plurality of integer values is different from root index values associated with synchronization signals transmitted from one or more base stations, and wherein a type of a synchronization source is associated with the one of the plurality of integer values; and
decode the secondary synchronization signal that is mapped in two symbols in a same subframe by:
determining, based on one of two different conditions, whether a first m-sequence of the secondary synchronization signal is mapped to first sub-carriers of the two symbols or mapped to second sub-carriers of the two symbols,
wherein indexes of the first sub-carriers are even numbers and indexes of the second sub-carriers are odd numbers.

2. The first wireless user device of claim 1, wherein the instructions, when executed by the at least one processor, cause the first wireless user device to decode the primary synchronization signal mapped in second two symbols in the same subframe.

3. The first wireless user device of claim 1, wherein the instructions, when executed by the at least one processor, cause the first wireless user device to:
determine, based on the root index corresponding to a first value of the plurality of integer values, that the second wireless user device has a synchronization timing originated from a base station.

4. The first wireless user device of claim 3, wherein $N_{ID}^{(1)}$ and $N_{ID}^{(2)}$ are associated with the secondary synchronization signal, where $N_{ID}^{(1)}$ is an integer selected from {0, 1, . . . , 167}, and $N_{ID}^{(2)}$ is 0 when the root index associated with the primary synchronization signal corresponds to the first value.

5. The first wireless user device of claim 1, wherein the instructions, when executed by the at least one processor, cause the first wireless user device to:
determine, based on the root index corresponding to a second value of the plurality of integer values, that the second wireless user device has a synchronization timing of an independent synchronization source.

6. The first wireless user device of claim 5, wherein $N_{ID}^{(1)}$ and $N_{ID}^{(2)}$ are associated with the secondary synchronization signal,
where $N_{ID}^{(1)}$ is an integer selected from {0, 1, . . . , 167}, and $N_{ID}^{(2)}$ when the root index associated with the primary synchronization signal corresponds to the second value.

7. The first wireless user device of claim 1, wherein the instructions, when executed by the at least one processor, cause the first wireless user device to determine whether the first m-sequence of the secondary synchronization signal is mapped to the first sub-carriers of the two symbols or mapped to the second sub-carriers of the two symbols by determining, based on a first communication mode of the two different conditions, that the first m-sequence of the secondary synchronization signal is mapped to the first sub-carriers.

8. The first wireless user device of claim 1, wherein the instructions, when executed by the at least one processor, cause the first wireless user device to determine whether the first m-sequence of the secondary synchronization signal is mapped to the first sub-carriers of the two symbols or mapped to the second sub-carriers of the two symbols by determining, based on a second communication mode of the two different conditions, that the first m-sequence of the secondary synchronization signal is mapped to the second sub-carriers.

9. The first wireless user device of claim 1, wherein the one or more wireless signals for direct communication is a device-to-device (D2D) communication signal.

10. A method performed by a first wireless user device, the method comprising:
receiving, from a second wireless user device, one or more wireless signals for direct communication between wireless user devices, wherein the one or more wireless signals comprises a primary synchronization signal and a secondary synchronization signal;
determining, based on the primary synchronization signal, a root index associated with the primary synchronization signal, wherein the root index associated with the primary synchronization signal corresponds to one of a plurality of integer values, wherein each of the plurality of integer values is different from root index values associated with synchronization signals transmitted from one or more base stations, and wherein a type of a synchronization source is associated with the one of the plurality of integer values; and decoding the secondary synchronization signal that is mapped in two symbols in a same subframe by:
determining, based on one of two different conditions, whether a first m-sequence of the secondary synchronization signal is mapped to first sub-carriers of the two symbols or mapped to second sub-carriers of the two symbols,
wherein indexes of the first sub-carriers are even numbers and indexes of the second sub-carriers are odd numbers.

11. The method of claim 10, further comprising decoding the primary synchronization signal mapped in second two symbols in the same subframe.

12. The method of claim 10, further comprising:
determining, based on the root index corresponding to a first value of the plurality of integer values, that the second wireless user device has a synchronization timing originated from a base station.

13. The method of claim 12, wherein $N_{ID}^{(1)}$ and $N_{ID}^{(2)}$ are associated with the secondary synchronization signal,
where $N_{ID}^{(1)}$ is an integer selected from {0, 1, . . . , 167}, and $N_{ID}^{(2)}$ is 0 when the root index associated with the primary synchronization signal corresponds to the first value.

14. The method of claim 10, further comprising:
determining, based on the root index corresponding to a second value of the plurality of integer values, that the second wireless user device has a synchronization timing of an independent synchronization source.

15. The method of claim 14, wherein $N_{ID}^{(1)}$ and $N_{ID}^{(2)}$ are associated with the secondary synchronization signal,
where $N_{ID}^{(1)}$ is an integer selected from {0, 1, . . . , 167}, and $N_{ID}^{(2)}$ when the root index associated with the primary synchronization signal corresponds to the second value.

16. The method of claim 10, further comprising:
determining whether the first m-sequence of the secondary synchronization signal is mapped to the first sub-carriers of the two symbols or mapped to the second sub-carriers of the two symbols by determining, based on a first communication mode of the two different conditions, that the first m-sequence of the secondary synchronization signal is mapped to the first sub-carriers.

17. The method of claim 10, further comprising:
determining whether the first m-sequence of the secondary synchronization signal is mapped to the first sub-carriers of the two symbols or mapped to the second sub-carriers of the two symbols by determining, based on a second communication mode of the two different conditions, that the first m-sequence of the secondary synchronization signal is mapped to the second sub-carriers.

18. The method of claim 10, wherein the one or more wireless signals for direct communication is a device-to-device (D2D) communication signal.

* * * * *